United States Patent
Grassadonia

(10) Patent No.: US 10,453,049 B2
(45) Date of Patent: Oct. 22, 2019

(54) PHYSICAL, LOGICAL SEPARATION OF BALANCES OF FUNDS

(71) Applicant: SQUARE, INC., San Francisco, CA (US)

(72) Inventor: Brian Grassadonia, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/198,793

(22) Filed: Jun. 30, 2016

(65) Prior Publication Data

US 2018/0005229 A1 Jan. 4, 2018

(51) Int. Cl.
*G06Q 40/00* (2012.01)
*G06Q 20/32* (2012.01)

(52) U.S. Cl.
CPC ......... *G06Q 20/3221* (2013.01); *G06Q 20/32* (2013.01); *G06Q 40/00* (2013.01)

(58) Field of Classification Search
CPC ........ G06Q 20/40; G06Q 20/10; G06Q 30/06; G06Q 40/00; G06Q 20/102
USPC ..................... 705/39, 35, 40, 26.1
See application file for complete search history.

(56) References Cited

U.S. PATENT DOCUMENTS

| 5,221,838 A | | 6/1993 | Gutman et al. | |
|---|---|---|---|---|
| 5,768,521 A | * | 6/1998 | Dedrick | G06Q 10/107 |
| | | | | 705/32 |
| 5,884,288 A | * | 3/1999 | Chang | G06Q 20/04 |
| | | | | 235/379 |
| 5,963,926 A | * | 10/1999 | Kumomura | G06Q 20/04 |
| | | | | 235/379 |
| 6,115,601 A | * | 9/2000 | Ferreira | H04M 15/47 |
| | | | | 379/114.2 |

(Continued)

FOREIGN PATENT DOCUMENTS

| WO | 00/79452 A2 | 12/2000 |
|---|---|---|
| WO | 2007/008686 A2 | 1/2007 |
| WO | 2018/005635 A2 | 1/2018 |

OTHER PUBLICATIONS

Isa, Ahmed Adamu "The Treasury Single Account (TSA) as an Instrument of Financial Prudence and Management: Prospects and Problems" 2016, Research Journal of Finance and Accounting, vol. 7 No. 4, pp. 66-71.*

(Continued)

*Primary Examiner* — Kelly S Campen
(74) *Attorney, Agent, or Firm* — Baker Botts L.L.P.

(57) ABSTRACT

Embodiments presented herein describe systems, methods, and products that may maintain separate databases to provide for logical and physical separation of funds maintained in a single account database. The single account database may include a database record containing the entire balance of a user's funds, but systems, methods, and products may split the funds between several, physically separated subaccounts that have balances related to the entire balance of the account by maintaining separate database records in the separate databases. The systems, methods, and products may receive requests for financial transactions, including credit and debit transactions, and may identify the target subaccounts to process the requests, wherein the target subaccounts are identified based on the information contained in the corresponding requests.

21 Claims, 15 Drawing Sheets

(56) References Cited

U.S. PATENT DOCUMENTS

| | | | | |
|---|---|---|---|---|
| 8,082,196 | B2 * | 12/2011 | Mullan | G06Q 20/04 705/35 |
| 8,249,965 | B2 | 8/2012 | Tumminaro | |
| 8,388,574 | B2 | 3/2013 | Hirszowicz et al. | |
| 8,494,957 | B2 | 7/2013 | Singhal | |
| 8,660,948 | B2 | 2/2014 | Dessert et al. | |
| 9,741,036 | B1 | 8/2017 | Grassadonia et al. | |
| 2003/0009402 | A1 * | 1/2003 | Mullen | G06Q 20/04 705/35 |
| 2010/0089998 | A1 | 4/2010 | Sandstrom et al. | |
| 2011/0213710 | A1 | 9/2011 | Newman et al. | |
| 2013/0103580 | A1 | 4/2013 | Ventura | |
| 2014/0114857 | A1 | 4/2014 | Griggs et al. | |
| 2018/0005203 | A1 | 1/2018 | Grassadonia et al. | |
| 2018/0005231 | A1 | 1/2018 | Grassadonia et al. | |
| 2018/0005323 | A1 | 1/2018 | Grassadonia | |

OTHER PUBLICATIONS

Cohen, Eric "XBRL's Global Ledger Framework: Exploring the standardised missing link to ERP integration" Aug. 2009, International Hournal of Disclosure and Governance, vol. 6, Issue 3, pp. 188-206.*

Non-Final Office Action dated Sep. 15, 2016, for U.S. Appl. No. 15/199,457, for Grassadonia, B., et al., filed Jun. 30, 2016.

Notice of Allowance dated Jan. 8, 2018, for U.S. Appl. No. 15/679,968, of Grassadonia, B., et al., filed Aug. 17, 2017.

International Search Report and Written Opinion for International Patent Application No. PCT/US2017/039731, dated Feb. 6, 2018.

Non-Final Office Action dated Sep. 20, 2017, for U.S. Appl. No. 15/679,968, of Grassadonia, B., et al., filed Aug. 17, 2017.

Non-Final Rejection dated Nov. 14, 2018, for U.S. Appl. No. 15/199,596, of Grassadonia, B., filed Jun. 30, 2016.

Notice of Allowance dated Apr. 21, 2017, of U.S. Appl. No. 15/199,457, for Grassadonia, B., et al., filed Jun. 30, 2016.

* cited by examiner

```
sub is_recurring (current_transaction) {
    for (i = all_past_transactions) {
        if (i == current_transaction) { //overloaded == operator
            current_transaction->make_recurring;
        }
    }
} sub predict_balance (future_date) {
    predicted_balance = $current_balance;
    for (i = all_recurring_transactions) {
        i_date = i->date;
        for (j=0; i_date <= future_date; i_date += i->period) {
            predicted_balance += i->summed_balance;
        }
    }
}
```

*FIG. 15*

PHYSICAL, LOGICAL SEPARATION OF BALANCES OF FUNDS

BACKGROUND

Account holders often have several banking accounts, e.g., checking, business, and savings. A user may establish additional accounts for different purposes, e.g., business and personal accounts. Opening a new account may be a complex process that involves creating an entirely new record associated with that user. But the new account will likely keep a separate ledger from the other account records, thereby making it difficult for the user to maintain and track the funds in each account.

DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 15 illustrates example pseudo code for two subroutines.

DESCRIPTION

Figure 1:
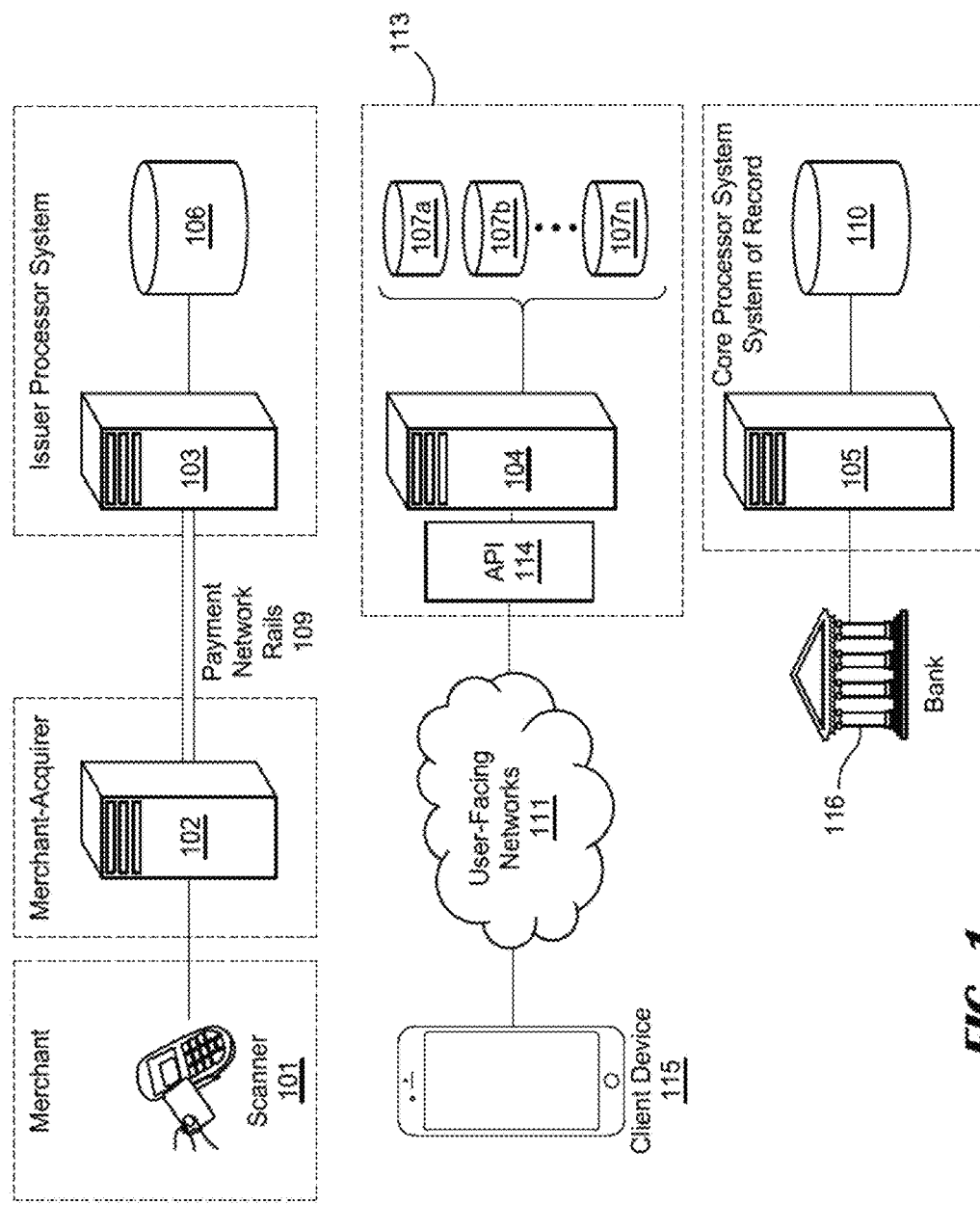
FIG. 1 illustrates an example of a system for processing payments, according to an embodiment.

Current payment processes and accounts provide little flexibility and analytics for the state of the account. Today, financial institutions, such as banks, that provide financial services, such as investments, loans and deposits, allow online access to a ledger of transactions to view past and non-posted transactions. Banks also allow users to open more than one account, such as a personal checking, business checking, or savings accounts. However, users open several, independent accounts that have no relationship to each other besides residing in the same bank and having the same account holder. This provides some value to users, but disparate account records are challenging to manage.

Embodiments described herein can more efficiently track and present account information than the conventional systems that require multiple accounts. Each sub-account is integrated within a single account record, as opposed to separate account records linked to a single user. In a conventional banking system architecture, each bank has a system of record or core processor, which provides the ledger of transactions for the bank's accounts. An account, such as a checking account or savings account, has an account number for electronic data processing. The account can also be associated with an American Bankers Association routing and transit number ("ABA RTN" or "RTN") or an International Bank Account Number ("IBAN"). The exemplary system architecture described herein establishes records having one or more sub-accounts associated with a bank account. Each of the sub-accounts is integrated within the banking account, as the sum of balances of the sub-accounts (positive or negative), can equal the balance of the bank account, and the real-time changes to the ledger reflecting a credit or debit to a sub-account will automatically update the balance of the sub-accounts and the bank account accordingly.

Other embodiments described herein aim to give users automated notifications and tracking of events affecting their bank accounts, such as by predicting how transactions will affect the balance. This prediction can be presented on a user interface to provide users with information more efficiently and enable tracking of account activity at a level previously unavailable. In one example, an improved system architecture allows presentation on a user interface of a mobile device of credit and debit transactions in a conversational view format with status updates that can reflect scheduled transactions and other recent transactions. Various embodiments of this improved system architecture provide several improvements over system architectures; for example, they can allow for more accurate, real-time accounting information by logically separated subaccounts at a server that has increased visibility of financial transactions. The increased visibility improves the function of the computer by allowing more control over the computer network and transactions that occur over the network, as explained throughout this specification. The system can predict a balance, display the predicted balance on this user interface, and update the user interface upon the execution of scheduled and unscheduled transactions.

The present disclosure is here described in detail with reference to embodiments illustrated in the drawings, which form a part here. Other embodiments may be used or other changes may be made without departing from the spirit or scope of the present disclosure. The illustrative embodiments described in the detailed description are not meant to be limiting of the subject matter presented here.

Various embodiments will now be described in further detail. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other obvious features not described in detail herein. Additionally, some well-known structures or functions may not be shown or described in detail below, to avoid unnecessarily obscuring the relevant description.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

FIG. 1 illustrates an embodiment of a system that includes several servers that handle various steps in a computerized system for tracking and presenting financial transactions, as well as displaying an account status based upon predicted transactions. Merchant computing device 101 can be a payment card payment processing terminal, such as a payment card scanner, that can request payment authorization to complete a sale. The merchant computing device 101, which can be any device capable of capturing payment request data on behalf of a merchant, can receive an input (e.g., swipe or dip a card, wireless transmission, keypad entry) of a user's payment card information, such as card verification value (CVV or CVVI), card verification code (CVC or CVC1), card identifier (CID), and payment card number, into the merchant computing device 101. Non-limiting examples of a merchant computing device 101 may include a point of sales (POS) terminal, a payment card payment processing terminal (e.g., a payment card scanner), a server for an online site, and a cash register. Non-limiting examples of payment instruments may include magnetic stripe cards, EMV cards, debit cards, credit cards, stored value cards, gift cards, and virtual cards or tokens that may be stored on a client device 115 (e.g., user computing device, smartphone, or computer). The merchant computing device 101 may comprise or may be coupled to various types of instrument readers configured to capture transaction data from certain types of payment instruments. For instance, if the payment instrument is a virtual card stored on a client device 115, and the client device 115 is configured to transmit payment request data for the virtual card using near field communications (NFC), then the merchant computing device 101 may comprise or may be coupled to an NFC scanner configured to capture the transaction data related to the virtual card via the NFC signal received from the client device 115. The client device can include one or more client applications stored in memory and executed on one or more processors. The client application can present information to the user and receive inputs from the user via, for example, a keyboard, mouse, or touchscreen. The client applications can be stored on a centralized server, such as the Google Play® store or iTunes®, and the user can download the applications from the centralized server to perform functions, such as those describe in this disclosure.

In operation, the merchant computing device 101 may capture payment card information and then generate and transmit a digital message, such as a payment authorization request, comprising the payment card information along with transaction data (e.g., transaction amount, merchant identifier) to a merchant-acquirer server 102. The merchant computing device 101 may be configured to generate digital messages containing the payment authorization request, which includes the payment card information and transaction data, may be generated according to particular protocols or specifications, e.g., one or more ISO standards in which the payment authorization request can contain certain fields for the payment card information and the transaction data. Non-limiting examples of data fields that may be included the digital message may include a merchant identifier (merchant ID), a merchant category code (MCC), an amount for the transaction, a timestamp (e.g., data, time), and a card number. In some implementations, the merchant computing device 101 may transmit the digital message containing the card and/or other payment information to a merchant-acquirer server 102, although in some embodiments, the digital message may be transmitted to other devices, such as an issuer processor server 103 of an issuer processor system.

Merchant-Acquirer

A merchant-acquirer server 102 may be any computing device configured to process an authorization request from a merchant and forward at least some of the information to an issuer processor server 103 over payment network rails 109 or card-issuer network (e.g., Visa® or MasterCard® networks). Each merchant computing device 101 is associated with a merchant-acquirer server 102 to process payment card payments. Although one merchant computing device 101 and one merchant-acquirer server 102 is shown, the system may comprise more than one of each the merchant computing device 101 and the merchant-acquirer server 102.

Payment Network Rails

Payment networks (e.g., Visa®, MasterCard®, and American Express®) may be entities that own and operate payment network rails 109, which may be a computing communications network configured to receive and transmit digital messages between merchants and merchant-acquirers to issuer processors and issuing banks. In operation, merchant computing devices 101 and merchant-acquirer servers 102 may generate, manipulate, and transmit digital messages containing payment authorization requests. The digital messages may be generated and manipulated according to the policies, standards, and protocols implemented by each particular payment network.

Issuer Processor

Issuer processor systems can establish payment card number records for customers, issue bills and statements, and process payments. The issuer processor server 103 can perform these functions and store transactions and payment card numbers in a storage device, such as database 106. Issuer processors will typically forward payment authorization requests to a system of record server 105. However, the exemplary system comprises a server 104 positioned between issuer processor server 103 and system of record server 105. Furthermore, server 104 can perform some or all of the functions typically associated with issuer processors, and therefore, in these embodiments, the merchant-acquirer server 102 can communicate over the payment network rails with server 104. Although the issuer processor server 103 and the server 104 are shown as separate computing platforms, the issuer processor server 103 and the server 104 can be implemented as a single platform. The positioning of server 104 in between issuer processor server 103 and system of record server 105 allows the server 104 to provide added functionality to the system, such as intervene in and record transactions in the payment stream (e.g., intercept payment authorizations). As a result, server 104 can also have access to all transactions associated with an account to provide further services to the client device 115 associated with the account.

Note that FIG. 1 illustrates a four-party scheme (or open scheme) in which the issuer processor server 103 is separate from the merchant-acquirer server 102. Embodiments of this disclosure can similarly function with three-party schemes (or closed schemes), such as (American Express, Discover Card, and Diners Club), in which the issuer processor server 103 and the merchant acquirer server 102 are the same entity.

The server 104 can be positioned between the issuer processor server 103 and the system of record server 105. Server 104 is part of a consumer computing system ("CCS") 113, which can also include an application programming interface (API) 114 and one or more databases 107a-107n. Server 104 can use API 114 to communicate with client device 115 over user-facing network 111, such as the internet. Databases 107a-107n can include information such a user profile, account numbers, and transaction ledgers. With this system architecture, server 104 can intercept transmissions of transaction messages that occur between issuer processor server 103 and system of record server 105. The server 104 does not need to perform an action on every transaction message, as the server 104 can just relay the transaction message. After receiving a transaction from issuer processor server 103 and recording information from that transaction, server 104 can forward the transaction to system of record server 105.

System of Record

System of record server 105 can be hosted by a bank 116 or a third party that provides a service to a bank 116. Some banks maintain their own system of record servers. The system of record server 105 maintains the accurate information of the balance of an account maintained by bank 116. Other transactions may be pending or in various stages of the payment stream, but the official recordation of those transactions is by the system of record server 105 and database 110. Certain parties, such as the account owner, the merchant, the issuer processor, or the CCS 113, may assume certain risks that an account holder does not have sufficient funds to fund a transaction, until the system of record records and authorizes the transaction. However, these parties may assume that risk to process transactions more quickly and efficiently.

Upon receiving a payment authorization request, server 104 can forward associated information to system of record server 105, which maintains an account corresponding to the payment card used in the payment transaction. Bank 116 can maintain the account using the system of record server 105, along with a ledger and other user profile information. System of record server 105 can also include database 110 that can store a copy of the ledger associated with the account record.

Server 104 can also be in communication over user-facing networks 111 (e.g., the internet) with client device 115. Client device 115 is illustrated in FIG. 1 as a smartphone, but can be any computing device, such as any mobile phone, tablet, smart watch, personal data assistant, gaming console, or personal computer. Consumer computing system 113 can also include several databases in communication with server 104, such as database 107a for storing user profile information, and database 107b for storing sub-account balances and ledgers.

Server 104 can communicate transactions to the system of record server 105, which can record in database 110 the payment authorization and further report it to the Federal Reserve and bank 116 that maintains the account record associated with the payment card used in the payment authorization. Bank 116 may also generate an authorization response to forward to the system of record server 105, back though other devices in the payment stream and eventually to the merchant computing device 101 to confirm that the merchant may complete the payment transaction.

The system can allow funds in an account to be physically and logically separated using a single account maintained at a bank 116 using database 110 and system of record server 105. Previously, users wanting to maintain separate accounts would have to open separate accounts at one or more banks 116. Embodiments of this disclosure described herein can rely on a single account, but physically and logically separate that account, maintained at system of record server 105, by maintaining a separate record in server 104, using databases 107a-n. For example, one of the databases 107a-n could be configured as a database for storing user profile information. This profile information can include a username, password, account number, routing/transit number, and one or more pointers to sub-accounts and ledgers for the sub-accounts. Each sub-account can have a balance that is an allocated amount less than or equal to the balance of the associated account. However, the total of all of the balances of the sub-accounts can be equal to balance of the account. In one embodiment, the sub-account totals can also differ from the account balance.

In some embodiments, assigning sub-accounts related to a single account allows for compartmentalization before payment, rather than allocated funds after a transaction. These embodiments allow for immediate updating of accounts during credit or debit transactions because the transactions occur using the sub-accounts, thereby updating the account record and sub-account records in real-time, rather than processing credit and debit transactions after the transaction completes.

In some embodiments, the sum of balances of all of the sub-accounts records can be different from the balance of the account balance when there are credits and debits that have not been synchronized to the account record. For example, the owner of server 104 might have a promotional bonus for using the service, and such funds from the promotional bonus can be maintained in a database 107 coupled to server 104. The funds can be paid from a separate account owned by the host of server 104. The server 104 might also not immediately synchronize with the system of record server 105 and the account maintained by bank 116, which can cause a temporary discrepancy between the account ledger stored in database 110 and the data in the account record. Note that each bank 116, the system of record server 105, and the server 104 track information about the account record, such as account number and balance.

Another reason for a discrepancy may be a credit due to paycheck being deposited in a bank account. While some embodiments described herein have visibility into the credit/debit payment stream, server 104 might not have direct access to all transaction data. Some paychecks are directly deposited into an account, which occurs outside of the credit/debit payment stream shown in FIG. 1. In certain embodiments, the system architecture can be configured to identify such deposits by polling banks or systems of record to identify transactions that took place outside of the credit/debit payment stream(s) that server 104 monitors.

Figure 2:
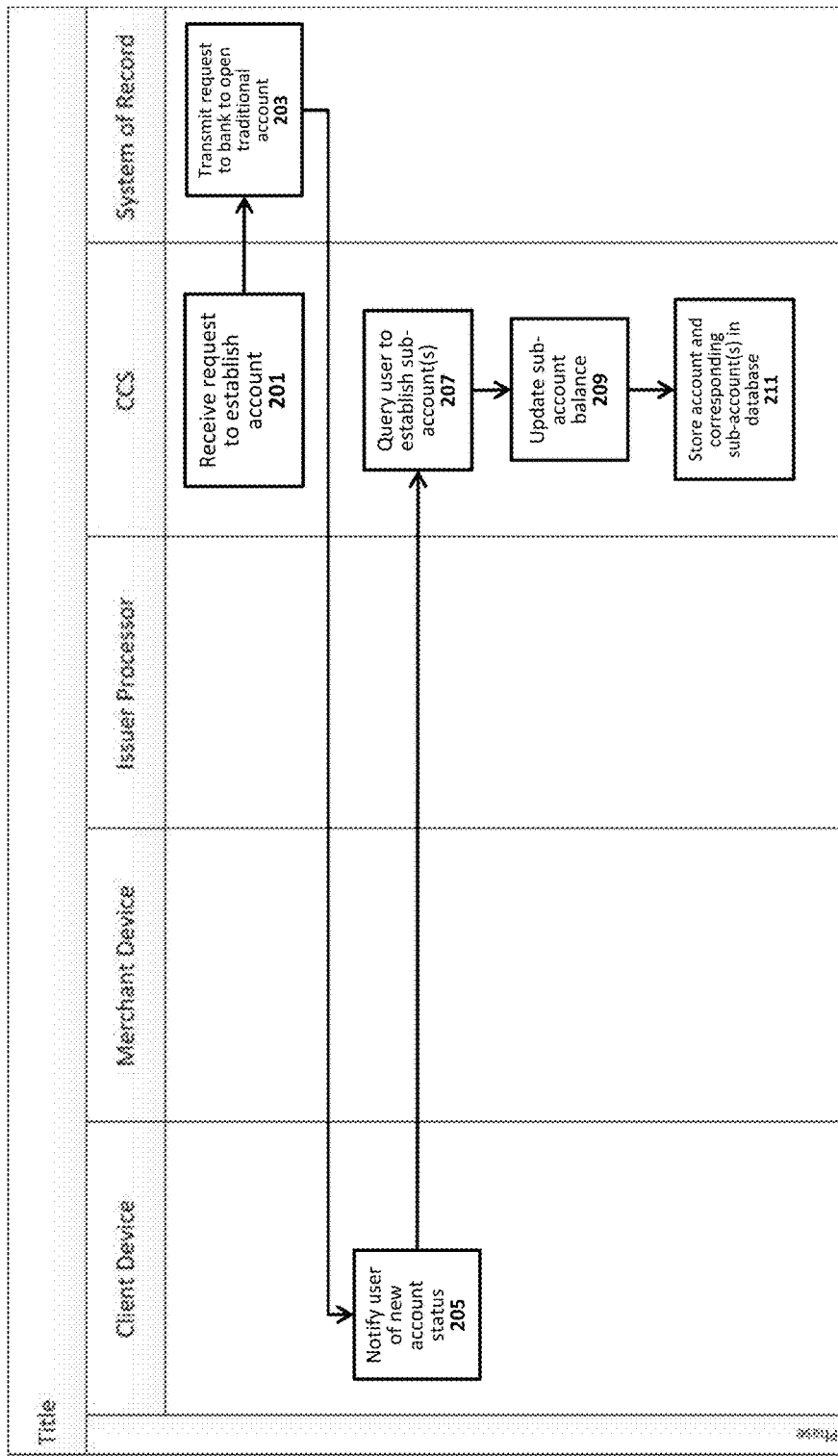
FIG. 2 illustrates an example of a process for establishing a sub-account.

FIG. 2 illustrates an exemplary embodiment for establishing an account record having corresponding sub-accounts. Step 201 includes receiving a request to establish an account. Initially, a user interested in using the system might not have any relationship with server 104, so the user will be registering with server 104 for the first time. The user can input a username and password, and other identifying information, such as name, address, social security number, date of birth, and prior addresses. In some embodiments, server 104 can use this information to execute a credit check on the user. Once registered, the server 104 can open an account record for the user. The server 104 might have pre-provisioned account numbers stored in one of a plurality of databases 107a-n. If server 104 does not have pre-provisioned account numbers, the server 104 can communicate with bank 116 to create the account (step 203) having a routing transit number, account number, and account balance. The account balance can be a copy of an account balance stored on the system of record server 105. The system of record server 105 can maintain the true account balance as reported to government regulators, such as the Federal Reserve. The server 104 can offer the user an option to open the account associated with a particular bank, or the server 104 can open the account without notifying a bank association. By not notifying the user, the server 104 can provide a "white label" service, such that, the user appears to interact only with server 104, and the backend services provided by the bank 116 and system of record server 105 are not visible to the user. However, server 104 can provide certain information, such as name and address of the account owner, to bank 116 to provide notification of who owns the account, and the bank can store such information in database 110.

Once opened or assigned an account number, the server 104 can notify the user of the account status (step 205), such as the account is available, or that an account was denied for some reason, e.g., terrorist association, bad credit, or insufficient funds. If opening an account was successful, the system can query the user to establish one or more sub-accounts (step 207). This can be accomplished by delivering a webpage to a user's web browser or by providing an application to the user's client device that contains a graphical user interface (GUI) for querying the user to establish one or more sub-accounts. Irrespective of the implementation, either the server 104 or another server associated with server 104 can provide such a query to establish one or more sub-accounts.

While some embodiment can allow for manual creation of sub-accounts, embodiments can also include automated creation of sub-accounts. For instance, if a user has a predetermined number of transactions within a certain category, e.g., restaurants, clothing, or food, the server 104 can automatically generate of suggest sub-accounts fitting these predetermined categories. The balances of these sub-accounts can be automatically determined based on the past transactions. For instance, the balance can be set to cover the average expenditure on the category, such that the server 104 can automatically notify the user if they exceed the monthly budget. Alternative embodiments can set the budget to the maximum prior monthly spend on in the category. If the server suggests a sub-account and corresponding budget, then the server can automatically deposit funds into the account every month, based on the suggested balance or a manually entered budget that the user assigns.

Note that this disclosure refers to generating information, e.g., graphics and graphical user interfaces, for display on a client device. Client devices and servers can cooperate in generating such information for display, such that each generates some or all of the information for display. For example, when stating herein that a client device generates information, the information can be generated at the server in response to a request from the client device to generate the information. Alternatively, the client device could generate the information locally for display. Still further, the client device and the server can generate portions of the information for display. For example, the client device can generate a GUI with fields, and the server supplies information to populate the fields. A person of ordinary skill in the art would understand that the server could generate at least part of the information in response to a request from the client.

The query to establish one or more sub-accounts (step 207) includes several sub-steps to establish a database record that allows at least one sub-account to be updated along with the account balance. These sub-steps include naming the sub-account using a sub-account identifier, which could be a character string, such as "vacation savings," and providing an amount to allocate the sub-account. The term "alphanumeric character" as used here refers to a symbol that can be a number (i.e., numeric), a letter (i.e., alphabetic), or a combination thereof. The amount can be less than or equal to the amount stored in the account. The server 104, or an application on the client device, can query the user about whether they want to set the sub-account as the default for receiving funds or making payments. The defaults can be for every credit or debit, or only certain credits or debits from specific third parties. Once established, the server 104 can record a balance of the sub-account (step 209), its sub-account identifier, and associated settings in an account record in one of databases 107a-n (step 211). The server 104 can also allow the user to identify a sub-account as a default for handling transactions.

While the system will debit a specific or default sub-account to complete the transaction, the system can enable a user to reassign the transaction to a different sub-account.

If the user accidentally charged a coffee to a vacation savings account, the user could reassign that payment to the coffee sub-account later. Sub-accounts can have several settings, for example, the user can establish a sub-account identifier, e.g., "coffee," such that the server 104 can process every payment made to a coffee shop, either based on, for example, merchant name or MCC, instead of using the default sub-account. The user can establish settings or rules that all payments on a certain day/time period are from a particular logical account (e.g., account with the most funds), or the desired sub-account is based on the MCC of the merchant (e.g., restaurant-related MCC deducts from food logical account).

When the balance of the sub-account is exhausted, the server 104 may notify the user that the sub-account has a negative balance, i.e., an overdraft, or decline the transaction due to insufficient funds. Note that the negative balance may not be an overdraft of all of the user's funds because the user might have additional funds in their account, but not allocated to the overdrafted sub-account. The user can choose either behavior by configuring sub-account settings stored in a database 107*a-n* coupled to server 104.

Figure 3:
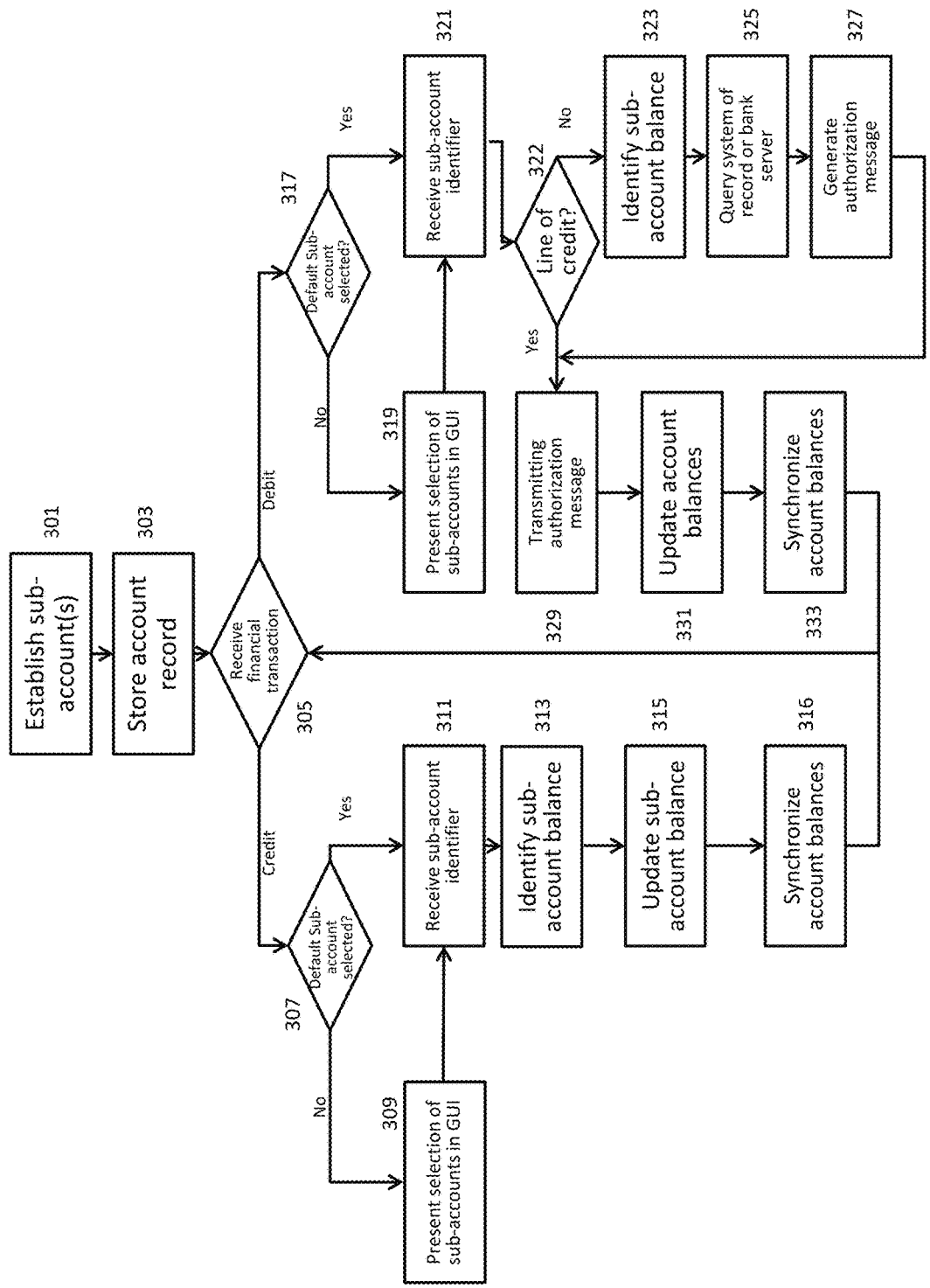
FIG. 3 illustrates an example of a process for processing a financial transaction using a plurality of sub-accounts.

FIG. 3 illustrates an embodiment for processing credit and debit transactions according to certain embodiments. Steps 301 and 303 correspond to FIG. 2, which explains the process for establishing one or more sub-accounts and recording information in the databases 107*a-n*. After establishing the account and sub-accounts, according to FIG. 2 and steps 301 and 303, the user is ready to receive a financial transaction (step 305). The financial transaction can be a debit or a credit transaction, a request for authorization, a hold on an amount, funds transfer, or a balance inquiry. For a credit transaction (i.e., receiving funds), the server 104 can receive a response to a polling query from either bank 116 or system of record server 105 that the bank account maintained by bank 116 received additional funds. In the example of FIG. 3, the server 104 can next determine a sub-account to apply the financial transaction to; note that this step can be performed before or after step 305. An account can also receive funds from other users' accounts. The other user's accounts would be debited, while the recipient's account would be credited. Server 104 can update its copy of the account balance, stored in databases 107*a-n*, to reflect the additional funds. The server first determines whether one or more sub-accounts are set to receive funds by default (step 307). If the server 104 also has settings for one or more default sub-accounts to receive the funds, then the server 104 can update sub-accounts accordingly. For instance, server 104 can credit certain amounts on a percentage or amount basis to predefined accounts or sub-accounts, e.g., $20 or 15% to a specific account, with the remainder going to one or more additional accounts.

Examples of default sub-accounts to receive funds can be savings accounts for purchases, such as a vacation or car, or accounts for budgeting, such as groceries, entertainment, and bills. Each credit to the account can be allocated across one or more sub-accounts. For example, amounts to be allocated can be on an amount or percentage bases. One or more sub-accounts can receive specific amounts, e.g., $25 for coffee and $100 for entertainment. Other sub-accounts can receive portions of the total amount of the credit or what is left over after specific allocations, e.g., 10% vacation savings and 2% for college savings fund. Another account can be set to receive the remainder of funds, e.g., general savings receives remainder of funds. If there is no default for receiving funds, then the server 104 can present a selection of sub-accounts in a GUI (step 309) to the user to select, via an interactive element (e.g., button, dropdown menu, radio button, or hyperlink) which account should receive the funds. In other embodiments, the server 104 can put the funds into a main account without allocating them to a sub-account. Note that the sum of sub-account balances can be equal to or less than the total balance of the main account because not all funds in the main account need be maintained in a sub-account too. Therefore, the server 104 can receive a sub-account identifier from a user before a transaction occurs via a default setting, or during the transaction by querying the user. Once a sub-account is identified for receiving the funds (step 311), the server can read the sub-account balance associated with the sub-account identifier from one of the databases 107*a-n* (step 313). The server 104 can then write a new value to the balance stored in the sub-account record in databases 107*a-n*. The system may also optionally provide an automatic notification to the user of the updates to their accounts. Finally, if the account ledgers at the system of record server 105 require updating, the server 104 can transmit a message to system of record server 105 to synchronize the balance across ledgers and store a transaction record containing data about the transaction in a transaction database 107*a-n* (step 315). The server 104 may also simultaneously, or within a predetermined amount of time (e.g., minutes or hours), transmit a message to the system of record server 105 or bank server 116 to synchronize the balances of the account records stored at both servers by transmitting at least a portion of the transaction data to system of record server 105 (step 316). Once completed, the server 104 can return to a sleep state until receiving another financial transaction (step 305).

When processing debit transactions (i.e., withdrawals), the server first determines whether one or more sub-accounts are set to pay for transactions (step 317). If the server 104 also has settings for one or more default sub-accounts to pay for a debit transaction, then the server 104 can update sub-accounts accordingly. For instance, server 104 can debit certain amounts on a percentage or amount basis from predefined accounts, e.g., $10 or 25% from a specific account, with the remainder coming from one or more additional accounts.

Default sub-accounts to pay for debit transactions can include "purchases" (e.g., a vacation or car or "budgeting" (e.g., groceries, entertainment, and bills). Each debit to the account can be allocated across one or more sub-accounts. For example, amounts to be allocated can be on an amount or percentage bases. One or more sub-accounts can be debited for one transaction, e.g., $20 from entertainment and $30 from food. Other sub-accounts can pay for portions of the total amount of the debit or what is left over after specific allocations, e.g., 10% vacation savings and 2% from general savings. Another account can be set to pay the remainder of funds, e.g., main account pays for any remainder. If there is no default account for paying funds, then the server 104 can present a selection of sub-accounts in a GUI (step 319) to the user to select which account should pay the funds. In other embodiments, the server 104 can pay the funds from the main account without allocating them from one or more sub-accounts. Therefore, the server 104 can receive a sub-account identifier from a user, who selected a sub-account identifier, before a transaction occurs via a default setting, or during the transaction by querying the user. Once a sub-account is identified for paying the funds (step 321), the server 104 determines whether the sub-account is a line of credit or an account that has funds (step 322.) If the sub-account is a line of credit, then the process continues to step 329, discussed later. Server 104 can provide one or more lines of credit, either issued by the owner of server 104, issued by a bank on card payment network 720 (see FIG. 7), or issued by bank 116. If the sub-account contains a balance, server 104 can read the sub-account balance associated with the sub-account identifier from one of the databases 107*a-n* (step 323).

Once server 104 identifies one or more sub-accounts for payment, server 104 can generate a payment authorization message to return to the merchant to approve the transaction. In one embodiment, server 104 can authorize the payment without first verifying whether funds exist in system of record server 105 or bank 116. This imposes additional risk on server 104 for authorizing a transaction for which funds may not exist in the account. However, generating an authorization message from server 104 can create a faster response and does not require waiting for a response from the system of record server 105 or bank 116. In another embodiment, the server can wait for a response from system of record server 105 or bank 116 (step 325) to make a determination of whether an account or sub-account has sufficient funds, which can result in a delay, but has the benefit of assurance that the funds are available and the transaction is recorded at the bank server 112 and at the system of record server 105, such that the various ledgers are updated to avoid overdrafts. The server 104, bank server 116 or system of record server 105 generates a payment authorization message (step 327) to signify approval of the payment request. The server 104 may then transmit the payment authorization message back through the payment stream to the merchant computing device 101 to approve the transaction, which the merchant may then complete with the user at the merchant computing device (e.g., POS terminal) (step 329). Even though the server 104 approved the transaction, it can still continue to document the transaction by updating copy of the account balance and sub-account balance to reflect the completion of the payment transaction and store a transaction record containing data about the transaction in a transaction database 107*a-n* (step 331), which can occur substantially simultaneously, or within a predetermined amount of time (e.g., minutes or hours), with the server 104 transmitting the authorization message to the merchant computing device 101. The server 104 may also simultaneously transmit a message to the system of record server 105 or bank server 116 to synchronize the balances of the account records stored at both servers by transmitting at least a portion of the transaction data to system of record server 105 (step 333). Finally, server 104 will return to waiting to receive another financial transaction (step 305).

Note that in an additional embodiment, a user can send funds to third parties using a paper check. The process would be similar to steps 317-333; however, rather than transmitting an authorization message in step 329, the server 104 can request that a paper check be printed and mailed to the third party. The rest of the steps would remain substantially the same. The server 104 can update the account balances in step 331 either in parallel with printing the check or after the check is cashed, and the server 104 may similarly synchronize account balances at that time in step 333.

Figure 4:
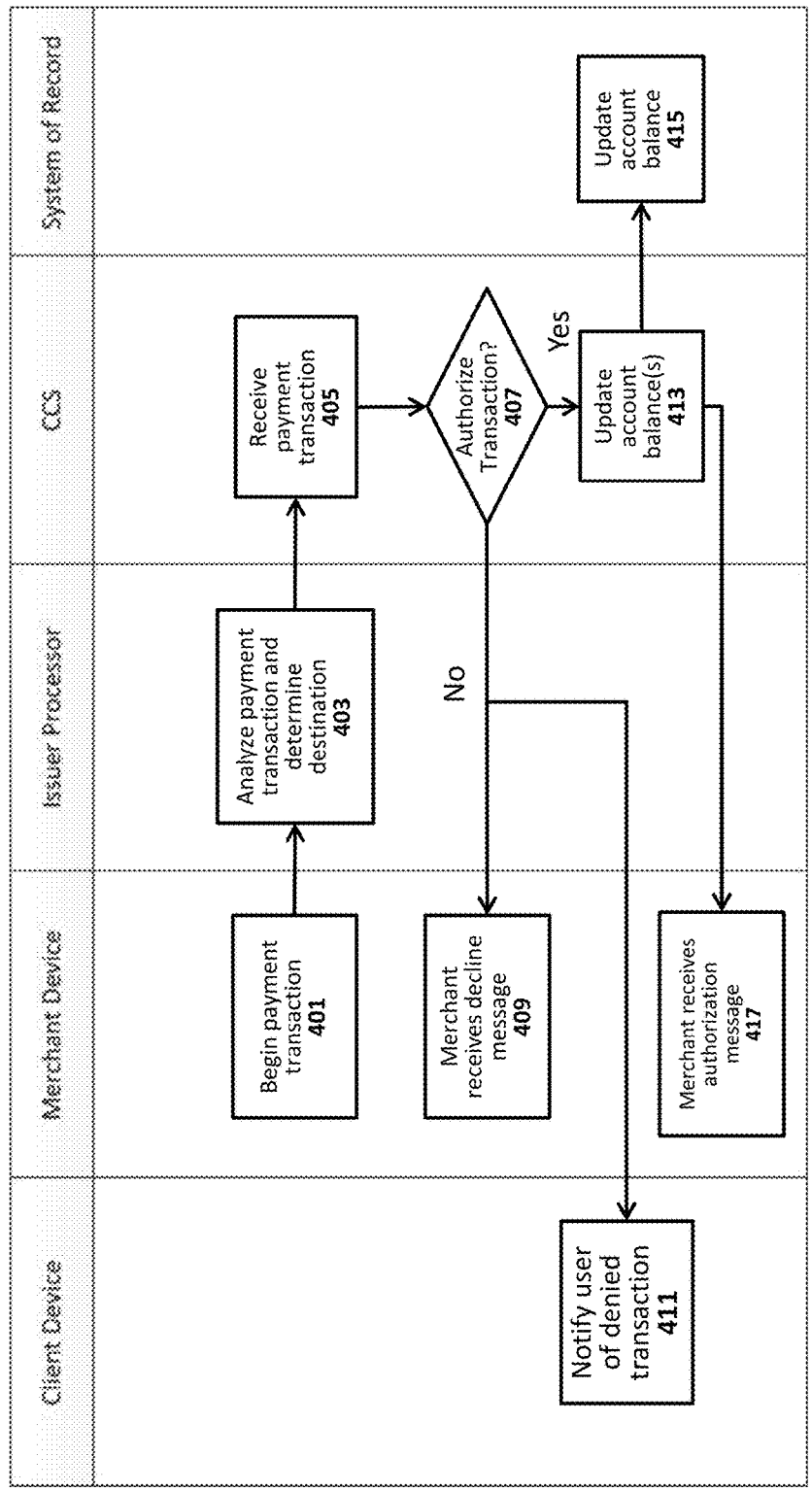
FIG. 4 illustrates a simplified example payment flow.

FIG. 4 illustrates a swim lane diagram of an embodiment for processing a payment transaction. In step 401, the merchant device 101 can begin a payment transaction by, for example, swiping or dipping a credit card or receiving an NFC payment. The merchant device 101 can then transmit payment transaction through the merchant-acquirer 102 to the issuer processor server 103 (step 403) and to CCS server 104 (step 405). The CCS server 104 can then decide whether to authorize payment based on user instructions and account balances (step 407). If the CCS server 104 authorizes the transaction, it can simultaneously update the copy of the account balance stored in one of databases 107*a-n* (step 413), transmit a message to update the account balance stored at the system of record server 105 (step 415), and transmit an authorization message to the merchant device 101 (step 417.) If the CCS server 104 declines the transaction, it can send a decline message to the merchant device 409 and a message to the client device 115 to notify the user of the decline of the transaction. The user can optionally not receive a message or receive information about why the transaction was declined.

Figure 5:
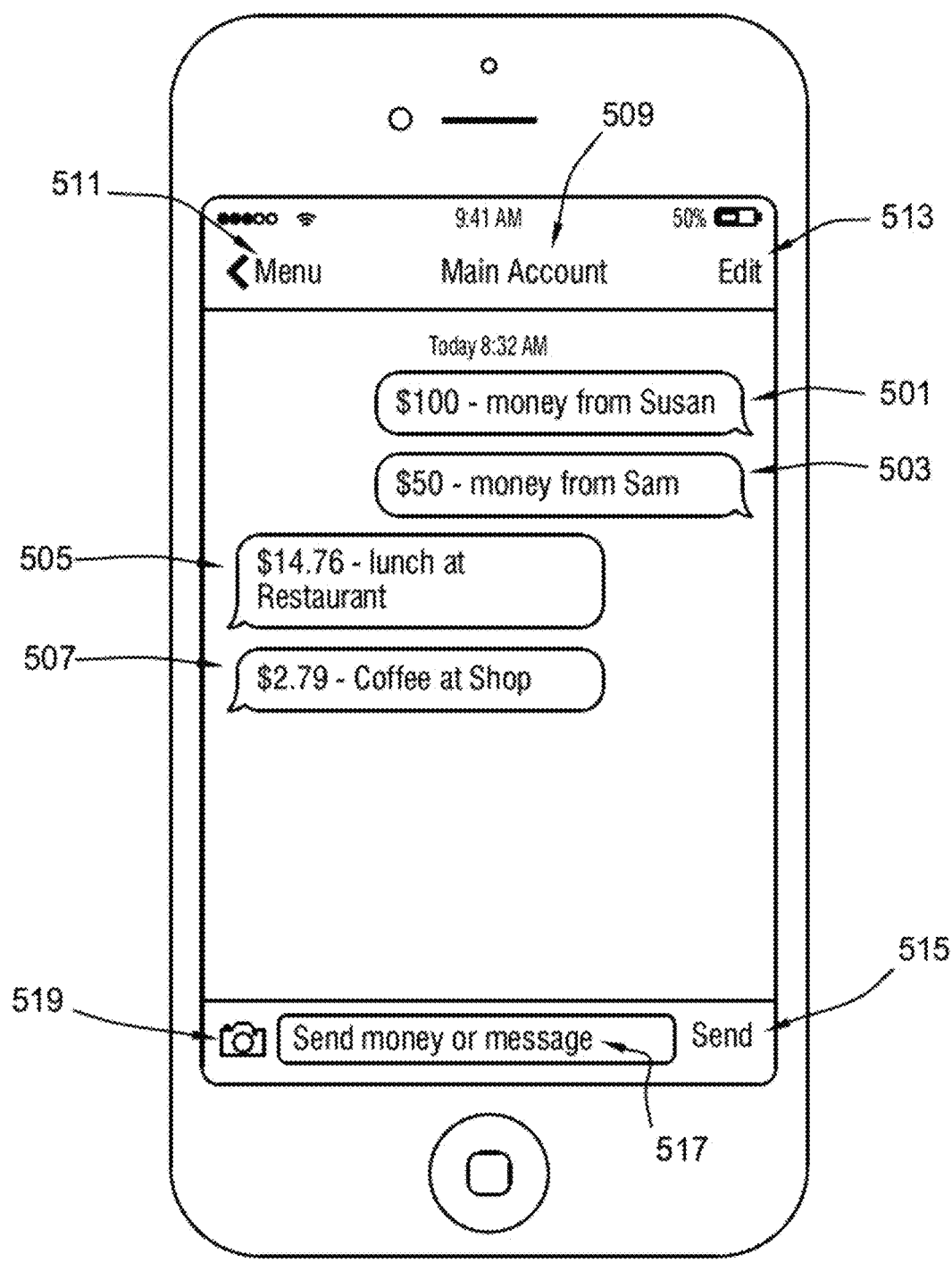
FIG. 5 illustrates a graphical user interface (GUI) for presenting a conversational view of financial transactions.

FIG. 5 illustrates a conversational view of a GUI for viewing a summary of financial transactions, including credit and debit transactions, that occurred in a "main account" according to label 509, e.g., the account or a sub-account. The conversational view can be presented on the client device 115. The conversational view includes items or transactions from two or more parties and can identify parties to the item or transaction. The user can request to view a summary of transactions in a conversational view, such as illustrated in FIG. 5. Upon receiving such a request, the client device 115 can retrieve a list of all transactions, or a subset of all transactions, from memory in client device 115 or server 104 and databases 107*a-n*. In one embodiment, the conversational view can include interface elements, such as light gray and dark gray bubbles or polygons embedding text or graphical account summary information, one color for each respective party. However, rather than having two parties, the conversational view of this disclosure can include multiple parties associated with the same color. In the example of FIG. 5, the credits can appear in bubbles aligned on a right side of the GUI (e.g., as a right column) and debits can appear in bubbles on aligned on a left side of the GUI (e.g., as a left column). In some embodiments, all credits can have the same color and all debits can have the same color, but different from the color used for credits. However, other embodiments are possible, such as a two-column conversational view with large amounts (e.g., over $100) appearing on one side or the other. Another embodiment could place transactions initiated by third parties on one side, such as credits or charges, and the other side could be transactions initiated by the user, such as transferring funds to sub-accounts or to a third party. Alternatively, transactions involving predefined parties can appear on one side or the other. Some embodiments can allow the user to configure which transactions appear on which side of the GUI. Continuing with the example of FIG. 5, credit 501 ("$100—money from Susan") and credit 503 ("$50—money from Sam") appear in bubbles on the right; the right bubbles can have a different color from the bubbles on the left. Debit 505 ("$14.76—lunch at Restaurant") and debit 507 ("$2.79—Coffee at Shop") appear in bubbles on the left of the GUI. Transactions 501-507 in FIG. 5 can also optionally contain timestamps for when they occurred. Note that the bubbles or polygons can be other shapes, such as ovals, clouds, or rectangles.

Alternative embodiments allow for credits and debits to have multiple colors to signify additional information, such as who originated the transaction, the type of party (e.g., restaurant or grocery store), transactions over a predetermined amount (e.g., $100), which sub-account processed a transaction.

Additional messages that can appear in the conversational view include reminders to pay bills, notifications that there are insufficient funds to satisfy a recurring payment, or that there will be insufficient funds to satisfy a recurring payment based on a predicted balance. The server 104 can also repeat certain messages other than credits and debits that are deemed important. For example, reminders to pay bills, notices of insufficient funds, messages from third parties, balance updates, notices of upcoming payments, notices of recurring payments, or any other messages that users may deem important. The server 104 may also allow users to modify which types of messages are important in their profile. Users might want repeated reminders of certain notifications, such as to pay the rent or electricity bill. The server 104 can allow users to program their profiles to repeat such notifications. Users may also select certain messages to select to be reminded about the notification again later, e.g., 1 hour, 1 day, or one week. If a user receives a notice that there are insufficient funds to make a payment, the server 104 can automatically generate a reminder to make the payment when the account or sub-account is sufficiently funded to make the payment. For example, whenever server 104 detects a credit, it can determine whether there are any upcoming or past-due debits, and, if the credit is large enough, notify the user that they now have sufficient funds to pay for the debit.

Users may scroll through their messages to see past notifications or future messages by, for example, swiping up, swiping down, or refreshing the GUI. Past notifications may also change based on events that occurred after server 104 generated the notification. For example, if server 104 generates a notification that rent is due, and the user pays the rent, then the server 104 can modify the notification that rent is due to clarify that rent is no longer due. Alternatively, the server 104 can simply identify that the rent was paid and delete the reminder to pay rent. Other examples include if a predicted balance is going to fall below a predetermined amount. If that is no longer true because the account or sub-account received a credit, then the server 104 can modify or remove the notification to state that the predicted balance will no longer fall below the predetermined amount.

Users may interact with the user interface elements or notifications to get additional information or modify the transaction. In the example of FIG. 5, the user may be able to select (e.g., touch, click, and tap) transaction 501 to see which sub-account the $100 was applied to, or to change the sub-account that the $100 was automatically applied to based on predetermined rules. Other information that the user may receive by clicking on transaction 501 can include the method of payment, e.g., payment card, bank account, or cash balance. Alternatively, server 104 could deliver a list of transactions that also occurred with Susan, who sent the $100. Similarly, for transactions 505 and 507, which are debits, the user may select either of those transactions to learn similar information, such as the particular sub-account used to pay the debit, other transactions associated with that third party, date/time of transaction, etc. The user may also be able to change the account used to pay the debit. For instance, if the $14.76 for lunch in transaction 505 was accidentally paid for out of a vacation savings sub-account, the user could change the sub-account used to pay for the lunch to a more appropriate sub-account, such as a budgeted amount for food for the month.

In some embodiments, the notifications in the conversational view can be time-ordered, i.e., appear in a temporal sequence. In other embodiments, the notifications in the conversational view can be in a contextual sequence, e.g., notifications related to coffee shops, restaurants, or funds transfers between friends. The contextual sequence can depend on parties to a transaction, MCC code, type of transaction, etc.

The GUI of FIG. 5 further includes a "Menu" button 511 and an "Edit" button 513. The "Menu" button 511 can allow the user to view a list of sub-accounts to view transactions or messages associated with the sub-accounts. The "Edit" button 513 can allow a user to edit transactions by, for example, moving the transaction to a different sub-account. In this example, each transaction was processed using the main account. The user can select the "Edit" button 513 for any transaction, such as "$100—money from Susan" to a sub-account, such as "Vacation." In this way, the user can save the $100 towards a vacation. The user can use button 519 to take pictures of receipts used for transactions. Sometimes merchants do not breakout what a payment amount was for. For example, for transaction 505, part of the $14.76 amount could have been used to purchase merchandise. The user may want to maintain a copy of the receipt associated with transaction 505 to record what exactly the $14.76 was spent on for business, tax, or accounting purposes. The user can click the button 519, take the picture, then select the transaction associated with the photograph. In the alternative to the "Edit" button 513, the user can select specific transactions by, for example, touching them associated interface elements, e.g., polygons, to get more information about the transaction or to edit the transaction.

The GUI of FIG. 5 also includes an input field 517 and send button 515 at the bottom of the GUI. A user could, for instance, send money to a third party or record a note in the account using the input field 517 and send button 515. To send money, the user could insert an identifier of the third party, such as a "cash tag," described further below, or email address, and an amount to send or request a sum. The conversational view of the GUI of FIG. 5 could be updated to reflect that message, and the amount, whether a credit or debit, would go to or come from the main account as identified by label 509. For example, the message could be "$50 sent to Bob" or "$50 requested from Chris." The messages could be updated, either via color change or notation, that Bob received the money or Chris paid the money upon completion of those events. Alternatively, each update could be stored as meta data in one of databases 107*a-n*, and the user could retrieve the meta data by clicking on the associated transaction to see the transaction status, e.g., scheduled for payment pending, completed, or money sent. Note that the status can be implied by the color of a polygon corresponding to the transaction, e.g., each status corresponds to a unique color. Other meta data that can be stored in a record in the database includes time of payment, payment due date, date payment was received, date payment was retrieved, method of payment, payee profile information, payor profile information, bank information, account numbers, sub-account identifiers, transaction status, method of payment, interest rates, type of currency, exchange rates, and expiration dates.

In some embodiments, all transactions will appear under the "Main Account" because every transaction affects the balance of the "Main Account," i.e., the account at bank 116. However, the user may select that only transactions that are not associated with a sub-account appear under the "Main Account." In addition, each sub-account can have different transactions in their respective conversational views to ensure that only transactions associated with the particular sub-account are reflected in its respective conversational view.

The client device 115 can have software installed on it to present the conversational view, either using an API native to the particular operating system (e.g., iOS or Android) or use proprietary functions to produce the conversational view. However, the information presented in the conversational view can come either from a database of transactions stored on the client device 115 or in one of databases 107*a-n*. The information and the behavior performed by clicking on a transaction in the conversational view is further controlled by the client device 115 in communication with server 104 through API 114 over user-facing networks 111. The client device can store a subset of all transactions that have occurred, but the server 104 maintains a record of all transactions processed using all accounts.

Server 104 can automatically identify recurring payments. For example, if the user pays the same amount of money on substantially the same day each month, then server 104 can identify that as a recurring payment. The recurring payment might be $700 for rent and appear around the 10th of the month. After a predetermined number of times for that payment appearing, the server 104 can record the recurring payment in one of databases 107*a-n* and expect a similar payment in every month. In this way, the server can predict a balance by subtracting all recurring payments from the current account balance. The same can be done for credits. If the user receives a $2,000 credit in the middle and at the end of each month for a paycheck, the server 104 can record a recurring credit and expect that recurring credit each month. This can be added to the current account balance to predict a balance.

Other embodiments can find that two or more transactions match, even if they are not exactly the same, e.g., certain parameters such as payees or amounts differ slightly. For example, a user might have a recurring payment for rent that includes incidentals, such as utilities, and therefore the rent payment may vary by within $50 dollars; however, the majority of the payment remains largely the same. The server 104 can still identify that the payments are sufficiently related by identifying that the payments were made at roughly the same time of month for roughly the same amount, within certain predefined thresholds, e.g., $50 or 5 days, respectively. In another embodiment, the server 104 can allow different payees to receive the payment. If a user pays different payees each month, but the amount and time of payment are within the predefined thresholds, then the server 104 can also identify those payments as related or recurring. When the server 104 identifies a potential recurring transaction, the server can assume that it is recurring or query the user to verify that the transaction will indeed recur.

Users can also identify financial transactions as recurring. For example, in the conversational views of FIGS. 5 and 6, the user can configure a recurring financial transaction with the server 104. The server 104 can then expect similar transactions in the future. If the financial transactions differ slightly, the server 104 can average them together or take the most recent transaction to predict what amount and time of the next recurring transaction will be. The transaction might not be the same because the amount could be an average of prior similar transactions and the future transaction will occur on a different date from the past transactions.

Once the server 104 identifies a recurring transaction, either automatically or via user input, the server 104 can query the user about whether the user wants to create a scheduled transaction, e.g., a scheduled payment of the recurring transaction, such that the user does not need to make any further input before the server 104 executes payment of the recurring transaction. A user can generate a transaction request using client device 115. The server 104 can schedule financial transactions for payment, including recurring transactions, in response to the transaction request. Users can also submit a transaction request to schedule financial transactions for one-time payment. Such a request can include a future date of payment, a payee, and a sub-account identifier corresponding to the account or sub-account to process the payment from. The server 104 can similarly ensure that there are sufficient funds in accounts used to pay the scheduled financial transactions, and notify the user if there are insufficient funds.

Figure 6:
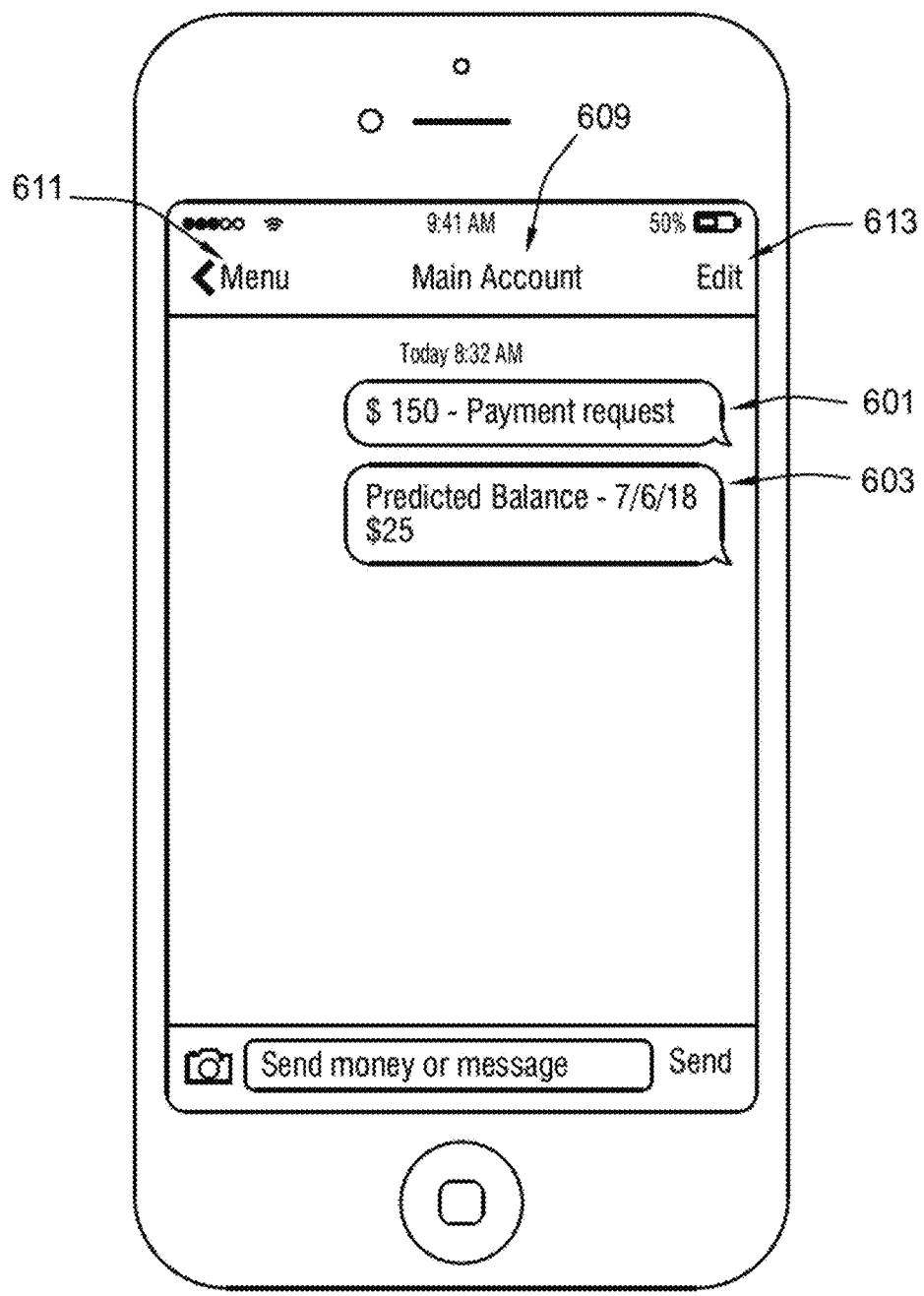
FIG. 6 illustrates a graphical user interface (GUI) for presenting a conversational view of financial transactions, including a predicted balance.

FIG. 6 illustrates an example of using the predicted balance. In this example, the user receives a payment request 601 for $150. This can happen when, for example, a friend asks for a $150 payment. Either in response to the payment request or due to a period of time passing, the server 104 can generate a predicted balance message 603. The predicted balance message 603 includes the date Jul. 6, 2018 when the predicted balance is $25. The user may use this information when deciding whether to satisfy the $150 payment request.

Server 104 can make adjustments or provide notifications based on the predicted balance. For instance, a user can set up automatic bill pay such that the phone bill should be paid after the 10th of each month but before it is late, and server 104 is familiar enough with the user's transaction history to avoid automatically paying the bill until the user is paid sometime between the 10th and the 15th each month. For instance, if a recurring or automatic payment will create a negative balance in the future, server 104 can postpone payment or notify the user that the predicted balance will be less than some predetermined amount (e.g., $0) at some point in the future, so the user can take steps to ensure that important payments are made or deposit more funds in their account to avoid an overdraft. The server 104 can also allow the user to modify the predetermined amount. For example, the user may want a notification if their balance is ever predicted to go below $100.

The server 104 can predict balances on any time scale based on stored recurring transactions. Irrespective of the period of the recurring payments (e.g., weekly, monthly, bi-monthly, yearly), the server 104 can predict a balance based on how many recurring transactions will occur between the current time and a selected future time.

Alternatively, the server 104 can modify payment dates based on the predicted balance. If the predicted balance is below the predetermined amount, server 104 can attempt to rearrange payments to avoid dropping below the predetermined amount. In the example above, a phone bill of $50 is due on the 20th, but the user typically pays it on the 10th. If server 104 predicts that this will cause the account balance to drop below the predetermined amount, then the server 104 automatically postpone or prompt the user to consider postponing the payment until after the 20th to avoid having the balance drop below the predetermined amount.

FIG. 15 includes exemplary pseudo code for two subroutines. The first is named "is_recurring," and is an exemplary method for determining whether a transaction is recurring. The server 104 can compare the current incoming transaction to all previous debit or credit transactions to see whether the transaction matches a previous transaction. The comparison between transactions can use an overloaded comparison method for determining whether two transactions match. The overloaded method can assess time of transaction, number of recurrences, amounts, etc. to determine whether the transactions match. To determine whether there is a match, the server 104 can compare transaction data to determine whether they are sufficiently similar. For example, if the dates are sufficiently similar to the same day of the month within a predetermined number of days, e.g., 5 days; if the amounts are sufficiently the same within a predetermined amount, e.g., $50 or 10%, or if the payees or payors are the same. The server 104 can take any combination of the parameters, such as if there are one, two or three matches, then that can mean that the transactions are sufficiently similar. Other transaction data can similarly be checked, such as MCC code, account numbers, addresses, and payment types. If the there is a match, then the server 104 can create a new recurring transaction using a make_recurring method, which can generate a predicted debit or credit transaction or potential transaction, comprising transaction data, such as amount, date, and payee/payor, which can be stored in one of databases 107*a*-*n* and used to predict a balance. The server 104 can also remove recurring transactions if they do not in fact occur, therefore the predicted transactions will only potentially occur. For example, if a user moves and no longer pays rent, the server 104 can expect a recurring payment to be made, but does not see it, and therefore can prompt the user to approve removing that recurring payment.

FIG. 15 also includes exemplary pseudo code for a second subroutine, "predict_balance," to predict a balance based on a future date. The subroutine can receive as an input a future date at which to predict the balance. The subroutine can then sum the current balance and all future recurring transaction data or potential transaction data that could occur between the present time/current date and on or before the future date to predict balance to produce a summed balance. The summing can be accomplished by adding positive numbers corresponding to credits and negative numbers corresponding to debits. Alternatively, the server 104 can subtract debits rather than add negative numbers, as the operations are mathematically equivalent.

The server 104 can also optionally run the predicted balance subroutine any time the user attempts to process a debit transaction to make sure that the predicted balance will not run below a predetermined threshold value, e.g., $100 or $0. The server can do this for the entire account balance or only the amount allocated to a sub-account used to complete the debit transaction. If the predicted balance will drop below the threshold amount, the server 104, or the client device 115, can issue a notification to the user to confirm the transaction and notify the user of the possibility that the balance will drop below the predetermined threshold value. The server 104 can either deny the transaction or allow the user to proceed at their option.

The predictive balance can also be an input to a financial health calculation. For instance, if a user is living "paycheck-to-paycheck," i.e., does not have a growing balance and frequently returns to near $0, this is a signal of poor financial health. Conversely, if a user is able to maintain a large balance or a growing balance, then the server 104 can generate a higher financial score. The scores can be numerical, e.g., 1-10 or color-coded, e.g., red, yellow or green. The scores can be associated with the main account balance or sub-account balances. In this way, a user can have a financial score associated with each sub-account and their main account. The user may optionally enable or disable the financial score for any account. When establishing a sub-account, the server 104 can query the user about whether they would like the financial health of the sub-account scored.

Server 104 can use other inputs to calculate the financial score. For instance, if the server 104 expects to receive a recurring paycheck, but it does not, then the server 104 can lower the financial health score because funds are being depleted without being replenished. Server 104 can also use data science, heuristics, and statistics in determining and weighting inputs to the financial score. For example, if the user routinely is capable of making payments, then they will have a higher financial score.

While the sub-account identifier was previously described as a character string, there are other examples. For instance, cash tag identifiers can be used as an account identifier, sub-account identifier, or "payment proxy." Cash tag identifiers can simplify transfer of funds between a sender and a recipient by use of a tagging mechanism. As used herein, the term "tagging" refers to a marking of an alphanumeric character (or a string of alphanumeric characters) to identify it (i.e., the character or string) for treatment in a specified way. Briefly described, the cash tag identifier enables a sender, who desires to send cash to a recipient, to trigger a money transfer by specifying, in any communication message, an amount and a recipient using one or more inputs having a particular syntax. The syntax includes a monetary currency indicator (or "currency indicator") prefixing one or more alphanumeric characters. The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies, e.g., dollar ($), euro (€), pound (£), rupee (Z), yuan (¥), etc. Although use of the dollar currency indicator ($) is used herein, the system could equally use any currency symbol.

In addition to the credit and debit examples discussed previously, cash tag identifiers provide efficient execution of other financial transactions (e.g., payment transfers between two users) by enabling a sender to trigger a money transfer using the syntax in any communication message. In particular, the sender can specify, in a communication message, an amount of money to transfer by including an input having the syntax, where the input can include the monetary indicator and one or more numeric characters (e.g., $10). In some instances, the sender can also specify, in the communication message, the recipient to whom the sender intends to send the money by including another input having the syntax. The input can include the monetary indicator and one or more alphabetic and/or numeric characters (e.g., $alex or $alex123). Such input identifying the recipient is referred to as a "payment proxy" in this description, as shorthand.

Figure 7:
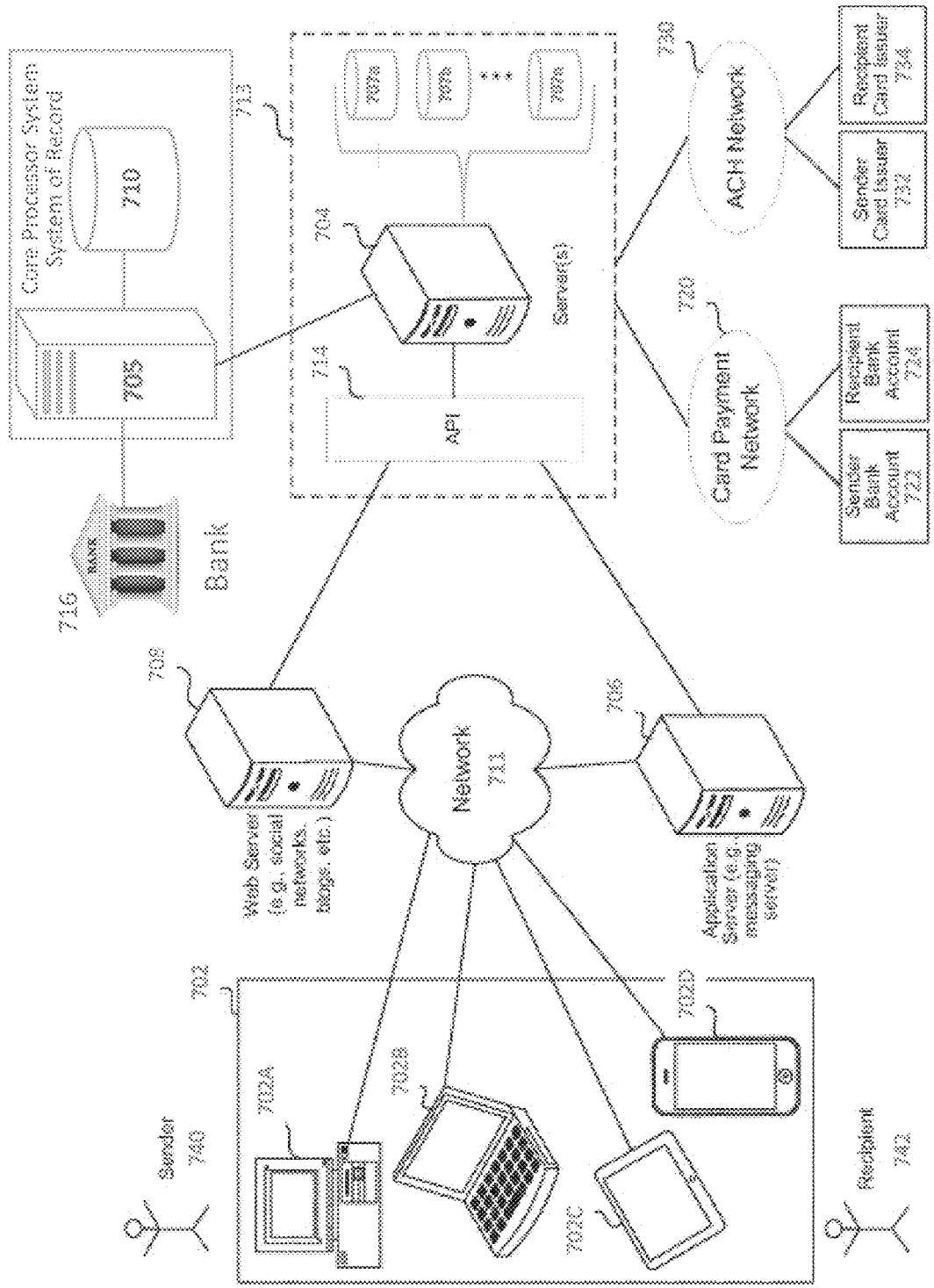
FIG. 7 illustrates an example of a network-based environment in which some embodiments of a payment proxy technology can be implemented.

FIG. 7 illustrates an example of a network-based environment in which some embodiments of the cash tag identifiers can be implemented. The embodiments illustrated in FIG. 7 include a client device 702, a server 708 of a third-party web content provider, a computer server system of a third-party application service ("application server 706"), and a consumer computing system 713, all of which are in communication over a user-facing network 711. In some embodiments, the CCS 713 includes one or more servers 704 and an Application Programming Interface API 714 ("API 714"). The one or more servers 704 are typically equipped with, or are coupled to, one or more databases 707*a*-707*n*, which can include one or more hard drives, a centralized or distributed data cluster, a cloud-storage service provider, or other suitable storage systems suitable for storing digital data. Items 704, 707*a*-707*n*, 711, 713, and 714, can be similar to those components illustrated in FIG. 1.

In other embodiments, the environment can have more or fewer components than shown, or a different configuration of components. The various components shown in FIG. 7 can be implemented by using hardware, software, firmware or a combination thereof, including one or more signal processing and/or application specific integrated circuits. Further, the environment of FIG. 7 can be implemented based on other architectures in other embodiments. For example, in some embodiments, the API 714 can exist separately from the CCS 713, e.g., as part of the server 704 or the application server 706, or as a standalone server (e.g., a standalone API server in communication with the server 704, the application server 706, and the servers 704). In another example, in some embodiments, functions of at least some of the servers can be consolidated.

The network 711 can include any combination of local area and/or wide area networks, using both wired and wireless communication systems. In some embodiments, the network 711 uses standard communications technologies and/or protocols. Thus, the network 711 can include links using technologies such as Ethernet, 802.11, worldwide interoperability for microwave access (WiMax), 3G, 4G, CDMA, digital subscriber line (DSL), etc. Similarly, the networking protocols used on the network 711 may include multiprotocol label switching (MPLS), transmission control protocol/Internet protocol (TCP/IP), hypertext transport protocol (HTTP), and/or file transfer protocol (FTP). Data exchanged over the network 711 can be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

The client device 702 can be any processing device capable of receiving user input as well as transmitting and/or receiving data via the network 711 by using a transceiver, e.g., one or more input/output devices for communicating over network 711, such as an Ethernet or WiFi adapter. In some embodiments, the client device 702 can be a conventional computer system (e.g., a desktop 702A or a laptop computer 702B) or a mobile device having computer functionality (e.g., a tablet device 702C, a smartphone 702D, or a conventional mobile phone (not shown)). The client device 702 typically includes a display that can be used to display a user interface, and may include suitable input devices (not shown for simplicity) such as a touchscreen, a keyboard, a mouse, or a touchpad. In some embodiments, the display may be a touch-sensitive screen that includes input functionalities.

The client device 702 can be configured to communicate via the network 711 with the server 704 and/or the application server 706. In some embodiments, the client device 702 can retrieve or send information to the server 704 and/or the application server 706, and run one or more applications with customized content retrieved from the server 704 or the application server 706. For example, the client device 702 can execute a browser application to enable communication between the client device 702 and the server 704 (e.g., to access a social networking website). In another example, the client device 702 can execute a customized client to enable communication between the client device 702 and the application server 706. For example, the customized client is a messaging application operated by a messaging server. The customized client can further provide a channel of communication between respective client devices of a sender 740 and a recipient 742 (e.g., a channel that enables transmission of one or more electronic messages including, e.g., text, audio, and/or video). For example, the customized client enables an instant exchange of electronic messages between the respective client devices. Other example messaging applications and/or messaging servers can include an email application and email server or a social networking messaging application and a social networking server.

In accordance with various implementations of the cash tag identifiers, the sender 740 can utilize a given client device 702 to trigger a money transfer to a recipient 742. For example, by accessing a landing page with the client device 702, the sender 740 can submit an amount of money to the recipient 742 that is associated with the landing page. In another example, the sender 740, using the client device 702, can transmit a message to the recipient (e.g., via a chat application or a forum), where that message includes an indication of an intent of the sender 740 to send money to the recipient through use of a specified syntax for one or more inputs in that message. The recipient 742 can similarly use another given client device 702 to receive the money, for example, by interacting with a confirmation link sent to the client device of the recipient 742 as a result of the money transfer triggered by the sender 740.

In an alternative embodiment, sender 740 can have an account maintained at the server 704, which can host a website that includes one or more graphical user interfaces (GUIs) for organizing and presenting content to users. For example, through the system website, users create account logins to connect to their social identities (e.g., social profiles or social accounts or shopping accounts), read content (e.g., messages, comments, posts), create or post content, communicate in real-time with other users (e.g., chat, post messages, comment on posts, etc.), and/or otherwise engage or interact with other users of the system web site (e.g., "friends," "followers," "social contacts," or other types of social network connections). In some embodiments, the user interactions on the system website lead to internal API communication, which involves the server 704 monitoring the user interactions for an indication of an intent to transfer money, e.g., by parsing messages at the system website. In response to such indications, the server 704 can transmit one or more requests (e.g., POST or GET requests) to the API 714 of the server(s) 704 to query the database(s) 707a-707n, and display the data returned by the API 714 of the server(s) 704 as appropriate. The server 704 can determine the indication of the intent based on an identification of a user input, e.g., a string of characters, that has a particular syntax, the syntax being a monetary indicator preceding one or more alphanumeric characters. The user input having the syntax operates as a trigger to send money to a particular recipient (e.g., recipient 742). The recipient can be identified based on a user input with the syntax (e.g., payment proxy represented by the user input), or based on a user account of a user currently accessing the system website (e.g., login credentials).

In one example, the server 708 monitors user messages on the system website for any particular message that includes a user input having the syntax of the monetary indicator preceding the alphanumeric characters, and forwards a request to the API 714. In such an example, the server 704 can identify the syntax by parsing the user messages to find, for example, a message that includes the syntax, and further parses that message to identify a payment amount and a payment proxy, and forwards such information to the API 714 and/or the server 704 to process the money transfer. In some embodiments, the server 704 parses the user messages simply to identify any message with input(s) having the syntax, and forwards that message to the server 704 via the API 714. In such embodiments, the server 704 can receive the message and can parse it for a payment proxy (e.g., one or more alphabetic characters of the user input having the syntax) to identify a recipient associated with the payment proxy. Upon identifying the recipient, the server 704 can identify an associated recipient financial account or sub-account based on the identifier or payment proxy, and initiate a money transfer to that recipient financial account. In some embodiments, the API 714 (e.g., instructed by the server 704) can also send back, in a response to the server 704, appropriate data for display to the user. For example, the data can be an HTML string that displays a confirmation message with a link for prompting the sender to confirm his/her intent to transfer money to the recipient associated with the payment proxy. In some embodiments, the server 704 sends a confirmation message to the sender using information included in the request received from the server 704, e.g., an identifier associated with the sender. For example, the identifier can be an email address of the user, and the server 704 (e.g., via an email server) sends an email message to the user's email address.

The application server 706 supports an application (hereinafter, "system application") that includes one or more graphical user interfaces for organizing and presenting content to users. The system application can be a mobile application installed on a mobile device or a conventional software application installed on a conventional personal computer. Users can utilize the system application to interact with other users. The system application can be a messaging application. For example, through the system application, users create account logins to connect to their social identities (e.g., social profiles or social accounts or shopping) to communicate with other social identities, read messages, create or post messages, communicate in real-time with other users (e.g., chat), and/or otherwise engage or interact with other users of the system application (e.g., "friends," "social contacts," or other types of social network connections). In some embodiments, the user interactions on the system website lead to internal API communication, which involves the application server 706 monitoring the messages for an indication of an intent to transfer money, e.g., by parsing messages at the system application. In response to such indications, the application server 706 can transmit one or more requests (e.g., POST or GET requests) to the API 714 of the server(s) 704 to query the database(s) 707a-707n, and display the data returned by the API 714 of the server(s) 704 as appropriate. In some embodiments, the system application performs the parsing. Upon identifying the syntax, the system application can notify the application server 706 of the indication of the intent to transfer money. Alternatively, in some embodiments, the system application notifies a payment service application executing on the user's device of the indication, where that payment service application communicates with the servers 704 via the API 714.

In one example, the system application monitors at the user device (e.g., client device 702 of the sender 740) for any particular message that includes a user input that has the syntax of the monetary indicator preceding the alphanumeric characters. Upon identifying such a message, the system application notifies the application server 706, which transmits a request to the API 714 that includes, e.g., the message and an identifier associated with a creator of the message (e.g., an email address), for the API 714 and/or the server 704 to process the money transfer. In such an example, the server 704 can parse the message for a payment proxy (e.g., the user input having the syntax) to identify a recipient associated with the payment proxy. Upon identifying the recipient and an associated recipient financial account, the server 704 initiates a money transfer to that recipient. In some embodiments, the system application communicates with a payment service application executing at the user's device via an API call (e.g., through API server 714). The payment service application can then further parse the identified message having the syntax to identify an amount of money for the transfer and a recipient for the transfer (e.g., payment proxy). The payment service application can communicate this information to the server 704 (e.g., via the API server 714), which processes the money transfer based on this information. In some embodiments, the payment service application forwards the message to the server 704, which performs the additional parsing to identify the amount of money and the recipient.

In some embodiments, the API 714 (e.g., instructed by the server 704) can also send back appropriate data relating to the money transfer for display to the user at the system application. For example, the data includes text that can be incorporated in, e.g., a push notification, that displays a confirmation message with an action link for the user to confirm his/her intent to transfer money to the recipient associated with the payment proxy. In some embodiments, the server 704 sends a confirmation message to the user using information included in the request received from the application server 706, e.g., an identifier associated with the user. For example, the identifier can be a telephone number of the user, and the server 704 sends a text message to the user's phone number.

The CCS 713 can be a cloud computing environment, a virtualized computing environment, a computer cluster, or any combination thereof. The CCS 713 includes a payment processor (not shown) configured to process money transfers conducted between a sender and a recipient identified by a payment proxy. As discussed briefly above, the CCS 713 includes the one or more servers 704. The payment processor can be a part of the one or more servers 704, and can work in coordination with the API 714 to exchange requests and responses with the server 704, the application server 706, and/or the payment service application associated with the CCS 713 to process one or more transactions triggered by use of the syntax (e.g., money transfers). The one or more servers 704 can handle secure transactions (e.g., using a secure server), to process all payment transactions triggered.

In general, the servers 704 store secure information such as credit card numbers, debit card numbers, bank accounts, user accounts stored in one of databases 707a-707n, e.g., payment proxies associated with users, user identifying or profile information, financial account information, or other sensitive information. Each user account can be associated with one or more card accounts of the user, e.g., debit or credit card accounts. A card account can be a financial account managed by a card issuer (e.g., a card issuer 732) and can be associated with the card number. In some embodiments, the one or more card accounts are stored at the server 704 (e.g., at the databases 707a-707n). Generally, the card issuer issues a physical payment card for each card account.

In some embodiments, the CCS 713 includes a payment service application server (e.g., a server of the servers 704) that supports a payment application for executing various services provided by the CCS 713. The payment service application includes one or more graphical user interfaces for presenting content and processing user requests. The payment service application can be a mobile application (e.g., "mobile payment application") installed on a mobile device or a conventional software application installed on a conventional personal computer. For example, through the payment service application, users create account logins to utilize financial services offered by the CCS 713, to link their financial accounts with the consumer computing system 713 (e.g., registration with the CCS 713), to transfer money using their user accounts and/or financial accounts, and/or otherwise engage with the services offered by the CCS 713 via the payment service application.

To process payment transactions, the CCS 713 can communicate with one or more financial networks. In some embodiments, the CCS 713 can communicate with a computer system of a card payment network 620, e.g., a debit card payment network (e.g., STAR or PULSE) or a credit card payment network (e.g., Visa® or MasterCard®), (collectively, "card payment network 720"). In some embodiments, the CCS 713 can communicate with the card payment network 720 over the same user-facing network 711, or a different network. In one example, the card payment network 720 can communicate, in turn, with the computer system of a sender card issuer 722, e.g., a bank, and a computer system of a recipient card issuer 724, e.g., a same or different bank. The sender card issuer 722 and the recipient card issuer 724 can transfer money, e.g., over a debit payment network, in response to a request to transfer money from the CCS 713.

In some embodiments, the CCS 713 can communicate with a computer system of an ACH network 730. The computer system of the ACH network 730 can communicate with a sender card issuer 732 and a recipient bank account 734. The sender card issuer 732 and the recipient bank account 734 can transfer money, e.g., using the ACH network, in response to a request to transfer money from the CCS 713. In other embodiments, there can also be computer systems of other entities, e.g. the card acquirer, between the CCS 713 and the card issuers, and between the CCS 713 and the bank accounts.

In some embodiments, the CCS 713 can transfer money between bank 716 and one or more of the recipient accounts on card payment network 720 and ACH network 730. The transfer of funds occurs similar to that illustrated in FIG. 3. In a first direction, a sender having an account at bank 716 can initiate a payment transaction to a recipient with an account over the card payment network 720 or the ACH network 730. The sender's account would be debited according to FIG. 3; however, the recipient's account would be credited in accordance with the processes associated with the respective networks. In the other direction, a sender with an account on card payment network 720 or ACH network 730 can begin a payment transaction by sending money to a recipient with an account at bank 716. System or record 705 can maintain the account in database 710. The sender would send the funds using the protocols associated with either card payment network 720 or ACH network 730, whereas the recipient would receive the funds in accordance with FIG. 3. In this way, server 704 can coordinate transactions between account holders having several different types of accounts.

In accordance with various embodiments, a payment transaction (e.g., a transferring of money) can originate at a device of the sender 740 ("sender device"), such as the desktop 702A. For example, the sender 740 can initiate a payment transaction by using the sender device to access and/or interact on a forum, such as a microblog hosted by the server 704. Alternatively, the sender 740 can initiate, for example, the payment transaction by using the sender device to access a landing page that is associated with a personalized URL, which incorporates a payment proxy of the recipient 742. In another example, the sender 740 can initiate a payment transaction by using a sender device to access an application such as a messaging application supported by the application server 706. In yet another example, a user can initiate a payment transaction by using a sender device to access an application such as the payment service application supported by the CCS 713.

The CCS 713 can process the payment transaction on behalf of the user. Processing the payment transaction involves identifying a financial account of a sender user and a financial account of a recipient user (e.g., by accessing the databases 707a-707n of the CCS 713).

In accordance with various embodiments of the disclosed technology, the financial account of the recipient user can be identified based on a payment proxy associated with the recipient user. For example, the recipient user may have previously created a payment proxy (e.g., $redcross) to be used with a service provided by the CCS 713 (e.g., a money transfer service), and entered financial account information through a GUI (e.g., an interactive payment receiving interface) of the payment service application of the CCS 713. In this example, the CCS 713, in turn, associates the financial account information with the recipient user's newly created payment proxy in this registration process. In other words, upon submission of information by the recipient user, the CCS 713 automatically registers the financial account and the payment proxy with the CCS 713 on behalf of the recipient user. The recipient user can submit financial account information for one or more financial accounts. Associations of the one or more financial accounts with the recipient user's payment proxy can be stored on the CCS 713 (e.g., databases 707a-707n). Information of the financial accounts can be used for future payment transactions (e.g., money transfers).

In accordance with various embodiments of the disclosed technology, the financial account of the sender user can be identified based on identifier associated with the sender user ("sender identifier"). In some embodiments, the CCS 713 can receive the sender identifier from the server 704 or the application server 706. In some embodiments, the CCS 713 receives the sender identifier from the payment service application supported by the CCS 713.

The CCS 713 can identify a financial account of the sender user based on an association between that financial account and the sender identifier. For example, the sender user may have previously received payment (e.g., from another sender user) and entered financial account information through a GUI of the payment service application of the CCS 713 (e.g., an interactive payment receiving interface). In such an example, the CCS 713 may have identified the sender identifier of the sender user (e.g., via email sent to the sender user or text message). In turn, the CCS 713 stores the financial account information in association with the sender identifier newly created by virtue of accepting the payment from the other sender user (using the service provided by the CCS 713). The sender user can submit financial account information for one or more financial accounts. Associations of the one or more financial accounts with the sender identifier can be stored on the CCS 713 (e.g., databases 707a-707n). Information of these financial accounts can be used for future payment transactions (e.g., money transfers).

If no financial account information is identified for either the sender user or the recipient user, the CCS 713 can send a message (e.g., a financial account request message) to the respective user requesting that financial account information to be submitted. The message can be a confirmation message that includes a secure link to enter the financial account information, such as a debit card number or a credit card number and associated authentication information (e.g., expire date, ZIP Code, PIN number, or security code). For example, the respective user can simply input financial account information, such as a debit card number or a credit card number.

When the financial account information is identified for both the sender user and the recipient user (either initially or later submitted through the confirmation message), the CCS 713 sends a request to transfer money, e.g. via the card payment network 720, the ACH network 730, or the bank 716. In particular, to transfer money between the sender user and the recipient user (identified based on the payment proxy), the CCS 713 can operate as a gateway or a middleman.

To operate as a gateway, the CCS 713 can identify debit card accounts, e.g. stored at the servers 704, for both the sender user and the recipient user. The CCS 713 can submit a request to an appropriate card issuer e.g., to the sender user's card issuer or to the receiving user's card issuer, to transfer money. For example, the request can be sent over debit rails. That is, a debit card network can receive the request and can carry out the request to transfer money. The appropriate card issuer can receive and process the request by transferring money to the appropriate card account.

To operate as a middleman, the CCS 713 can receive a payment amount by processing a payment card, e.g., a credit card or a debit card, of the user sender and hold the payment amount. The CCS 713 can push the payment amount, e.g., over debit rails, to a debit account of the recipient user. Instead of holding the payment amount, the CCS 713 can also forward the payment once the recipient user links the account with the CCS 713. Alternatively, the CCS 713 can generate a transaction ACH that debits an amount from the sender bank account and can credit the amount into a recipient bank account, e.g., using ACH, or onto a debit account, e.g., over debit rails, of the recipient user. Alternatively, the CCS 713 can generate a transaction to system of record server 705 to either debit or credit an account stored at bank 616, according to a corresponding transaction over either card payment network 720 or ACH network 730.

While payment proxies can be non-hierarchical, such as $redcross, they can also be hierarchical. For instance, if several users want an account labeled $redcross, they can name the account hierarchically using, for example, their username, e.g., $JaneDoe/redcross and $JohnSmith/redcross. The account hierarchy can be multiple levels deep, such as $JaneDoe/redcross/syrianRefugees or $JaneDoe/redcross/japanEarthquake. Embodiments are not limited to a certain number of levels of hierarchy for payment proxies.

Sub-accounts can have other settings, such as reminders to save money or pay bills. In one embodiment, a sub-account can be used to save for a trip and have a deadline for saving a certain amount, with reminders at certain intervals, such as 6 months before, 3 months before, and 1 month before. Each reminder can state the progress of savings, such as the amount and percentage towards goal. Accounts can also have monthly reminders to contribute to savings, or automatically make those contributions. The ability to set up and configure sub-accounts, without having to visit a bank, gives users much more flexibility and efficiency than previously available. Placing server 104 between the issuer processor server 103 and the system of record server 105 enables this flexibility and efficacy, along with the programming structure to accomplish these goals.

Another goal is to pay bills and provide reminders to pay bills. Users can configure their sub-accounts to pay bills by inputting payment information, such as account and transit routing numbers to make an ACH payment at periodic intervals. For instance, a user may owe $1,000 each month for rent, and can configure a sub-account to be credited $1000 each month and debited $1,000 when rent is due. Alternatively, the user could manually perform either or both of these tasks. Again, this system provides the user with much more flexibility than previously available.

Figure 8:
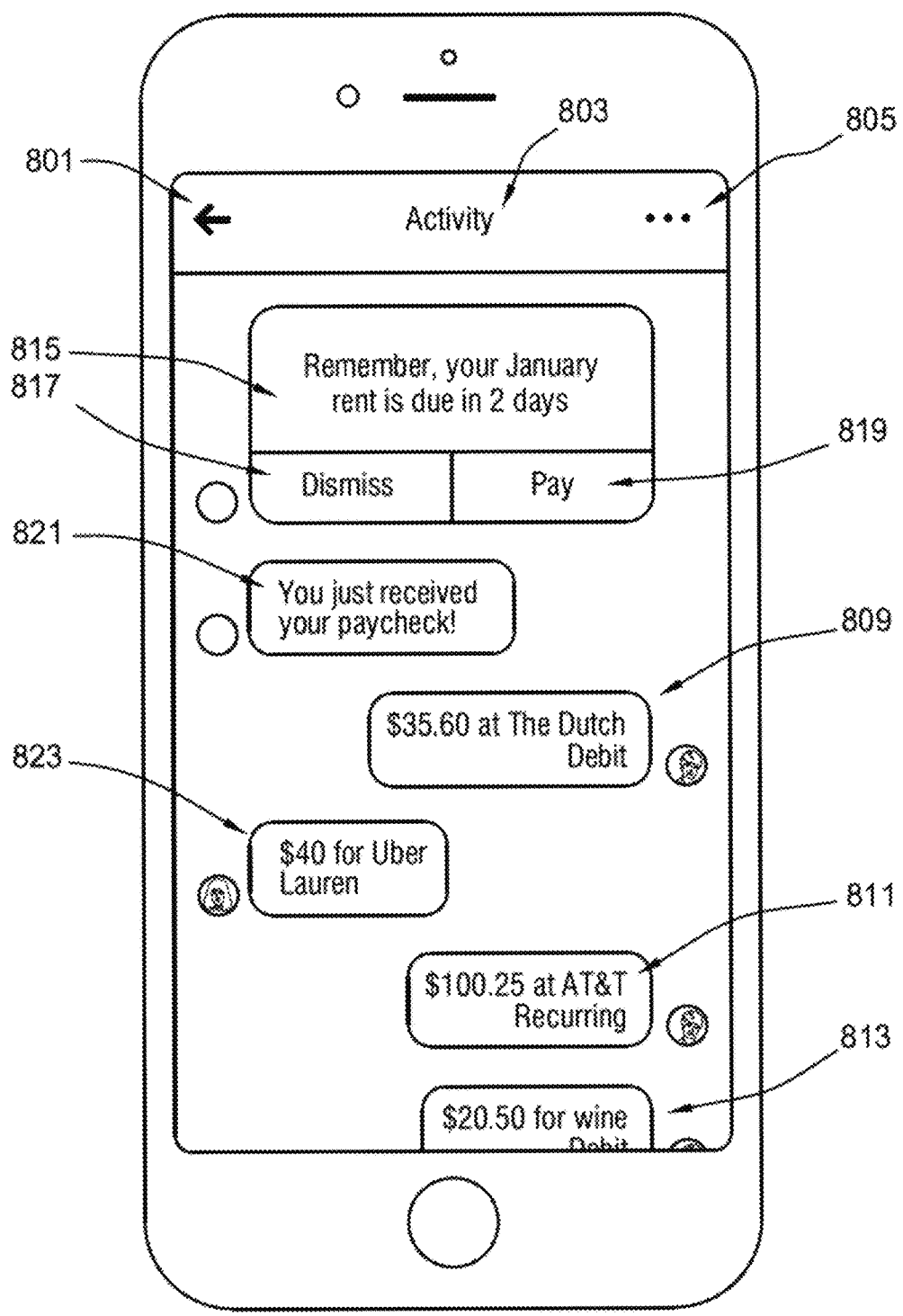
FIG. 8 illustrates an example embodiment of a conversational view.

FIG. 8 illustrates another exemplary embodiment of a conversational view, similar to FIGS. 5 and 6. The embodiment of FIG. 8 includes a back button 801, which can allow a user to return to the previous menu or screen. This embodiment also includes a title 803, "Activity," and includes a more options icon 805 ("●●●"), which can allow a user to see additional options for the screen that they are on. In this embodiment, the additional options can include an option to edit the activity, e.g., move transactions to different sub-accounts, remove transactions from the activity log, or make notes on the transactions. Alternatively, a user could select a transaction via, for example, a double-click, click, long-press, or hard press.

The conversational view of FIG. 8 can have a listing of several transactions. Each transaction can appear in a polygon or bubble, and can have information such as amount, transaction type (e.g., credit or debit parameter, or positive/negative amount), name of payee or payor, or a picture of the payee or payor. In this example, user-initiated transactions appear on the right, and third-party-initiated transactions appear on the left. Transaction 809 is a debit and states, "$35 at The Dutch," and can appear beside a picture of the user. Transaction 811 is a debit and states "$100.25 at AT&T," and appears besides a picture of the user. Transaction 811 also contains a "Recurring" indication, indicating that this is a recurring payment, such as a phone or internet bill. Server 104 could previously have identified payments to AT&T of similar amounts at the same time of month as recurring. Transaction 813 is another debit that states, "$20.50 for Wine." Transaction 815 can be a reminder that states, "remember your January rent is due in 2 days." Transaction 815 can further include dismiss button 817 to dismiss or remove the transaction from the conversational view. Transaction 815 can also include pay button 819, which can allow the user to pay the rent, which is discussed further in FIG. 11. The conversational view of FIG. 8 can also include transaction 821, which states, "You just received your paycheck!" Transaction 823 is a credit that states, "$40 for Uber," and further states that it is from Lauren and includes her picture.

Figure 9:
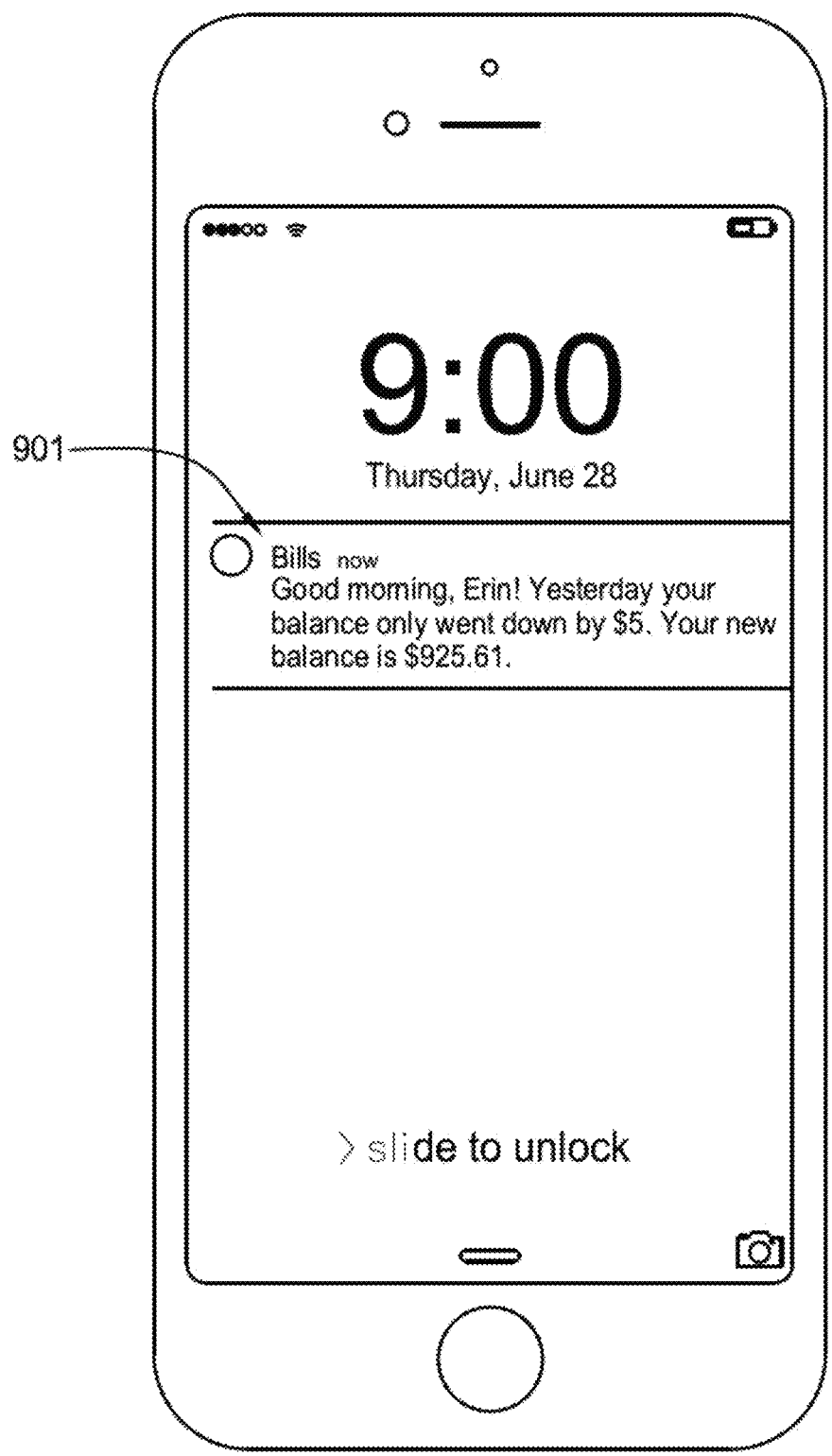
FIG. 9 illustrates an example embodiment of a notification related to an account.
Figure 10:
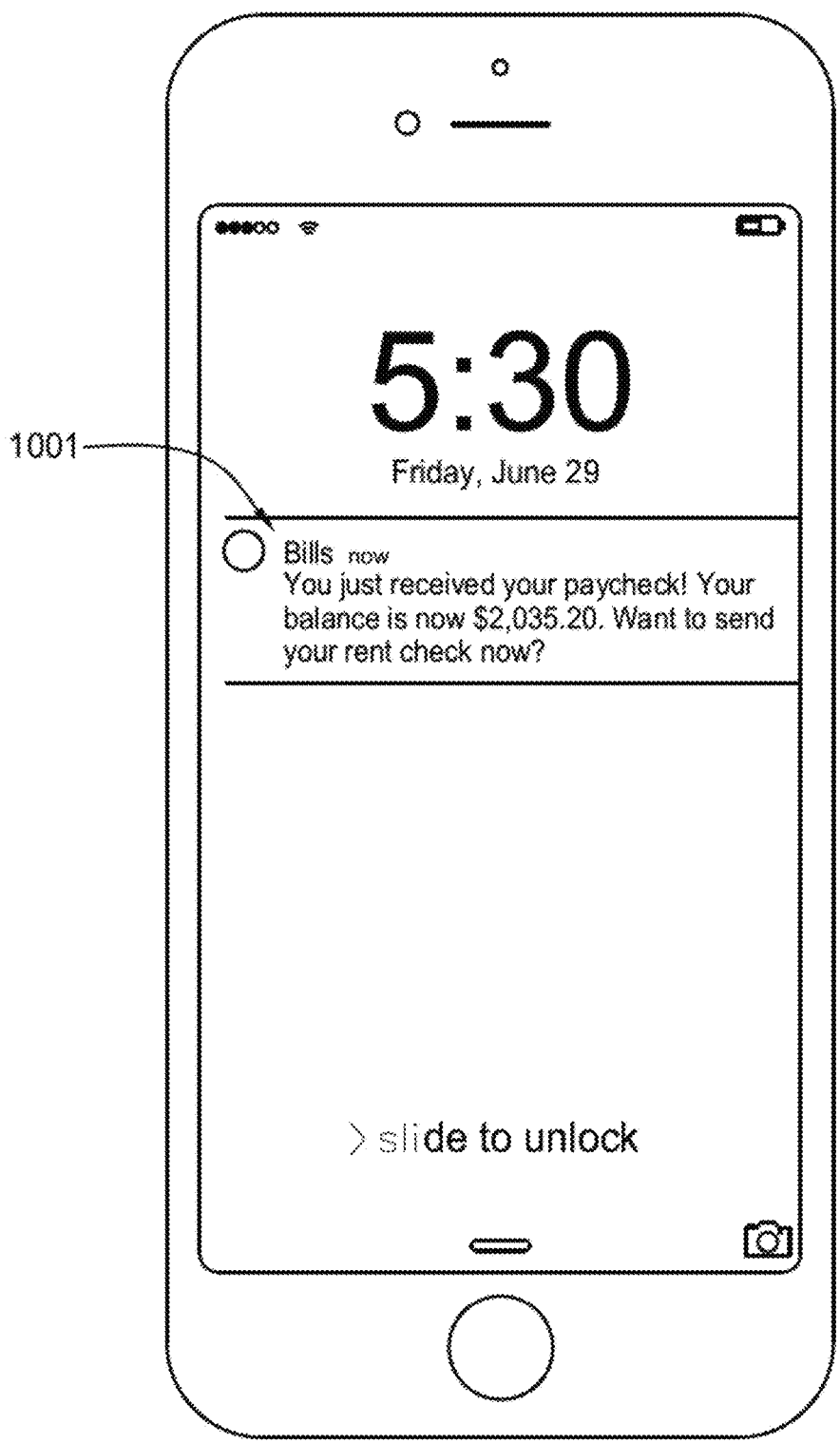
FIG. 10 illustrates an example embodiment of a notification using analytics.

FIG. 9 illustrates an exemplary embodiment of a notification related to an account. Notification 901 from "Bills" states "Good morning, Erin! Yesterday your balance only went down by $5. Your new balance is $925.61." Bills can be the name of the application that runs on the user's device. Either the server 104 or the user device can automatically inform the user of their balance at a predetermined time each day, e.g., 9 AM. A user may be able to configure when and whether to receive a daily notification such as notification 901. FIG. 10 illustrates another exemplary embodiment of a notification using analytics. Notification 1001 is also from "Bills" and states, "You just received your paycheck! Your balance is now $2,035.20. Want to send your rent check now?" In this example, server 104 can compute and determine that the user did not have enough funds to pay a bill, e.g., the rent, prior to receiving their paycheck, and can therefore proactively remind the user to pay the rent once they receive their paycheck. The user can also request a reminder to pay the rent later. For example, in FIG. 8, the conversational view includes transaction 815 stating that rent is due. If the user presses dismiss button 817, the user device can display an option for a reminder, such as notification 1001, or can automatically generate a reminder such as notification 1001 after receiving the paycheck.

Figure 11:
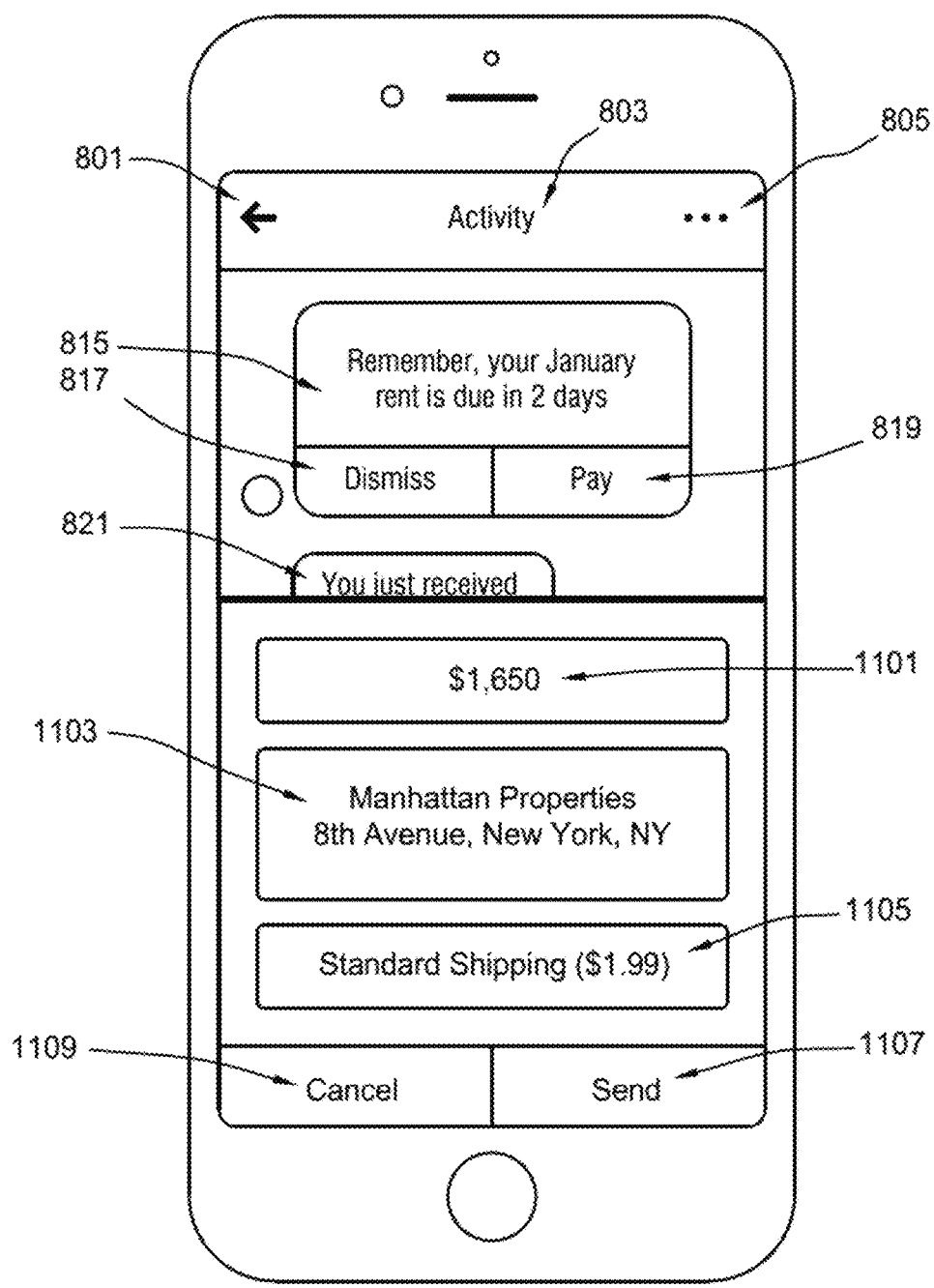
FIG. 11 illustrates an example embodiment of a conversational view allowing interaction with a transaction.

FIG. 11 illustrates an exemplary embodiment of a conversational view when the user clicks pay button 819 or after opening notification 1001. In either case, a window can appear that includes payment information, such as field 1101 containing the amount of rent due, field 1103 containing the address to send the rent check to, and field 1105 containing shipping options for the payment. The shipping options can also include printing and mailing a check. Some embodiments can allow the user to click on any of these fields to edit them. For example, the user can select field 1105 to change shipping or payment options to, for example, have the server 104 print and mail a check. Send button 1107 can allow the user to complete the payment, possibly including printing and mailing a paper check, or doing an electronic funds transfer. The user can use cancel button 1109 to cancel rent payment and return to a similar screen as presented in FIG. 8.

Figure 12:
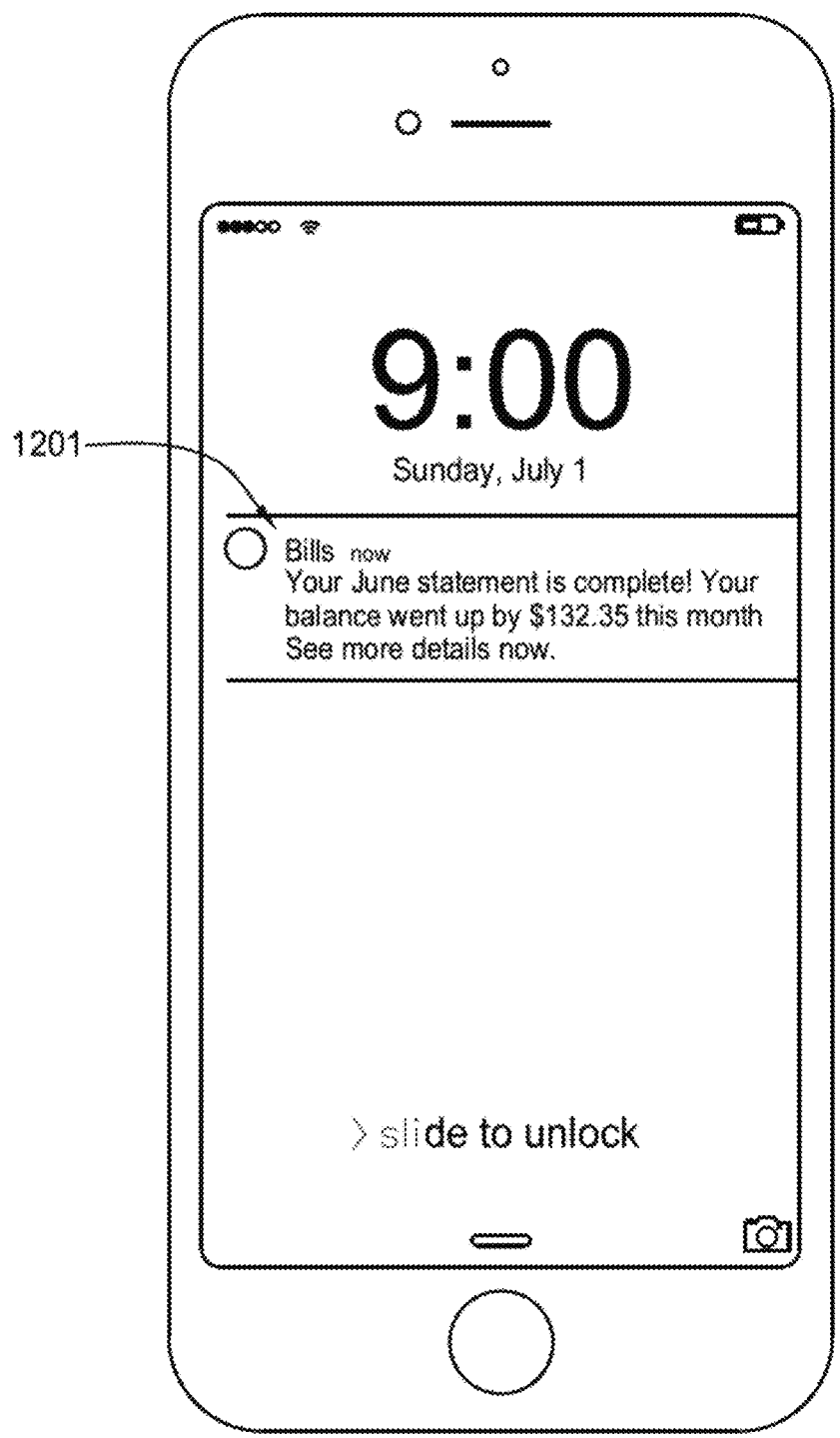
FIG. 12 illustrates an example embodiment of a notification using analytics.

FIG. 12 illustrates an exemplary embodiment of a notification using analytics. Notification 1201 states, "Your June statement is complete! Your balance went up by $132.35 this month. See more details now." Similar to FIG. 10, the user can configure when, how, or whether to display notifications such as notification 1201.

Figure 13:
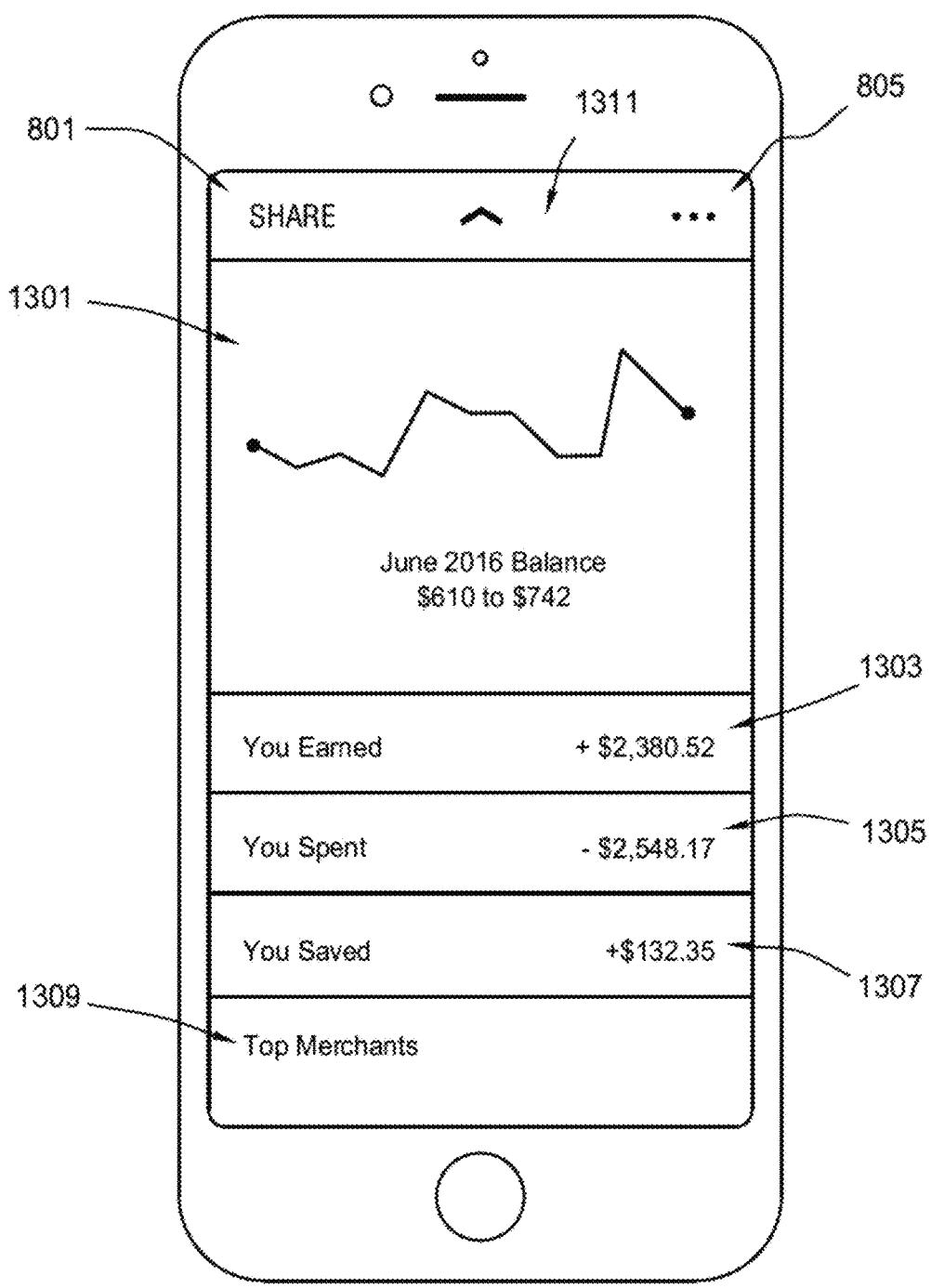
FIG. 13 illustrates an example embodiment of an account balance over time.

FIG. 13 illustrates an exemplary embodiment of an account balance over time. Field 1301 can contain a chart demonstrating a user's balance over a period, such as a month. In this example, field 1301 includes the balance over the month of June, and lists the starting and ending balances ("$610 to $742"). Field 1303 can contain a sum of all credits over the period, and in this example is labeled, "You Earned +$2,680.52." Field 1305 can contain a sum of all debits over the period, and in this example is labeled, "You Spent −$2,548.17." Field 1307 can contain the change in balance over the period of time, and in this example states, "You Saved +$132.35." Field 1309 can contain a listing of "Top Merchants" where the user spent the most money or had the most transactions. Arrow 1311 can allow the user to return to the previous menu or screen. Share button 1313 can allow a user to email or post to social media their balance over time.

Figure 14:
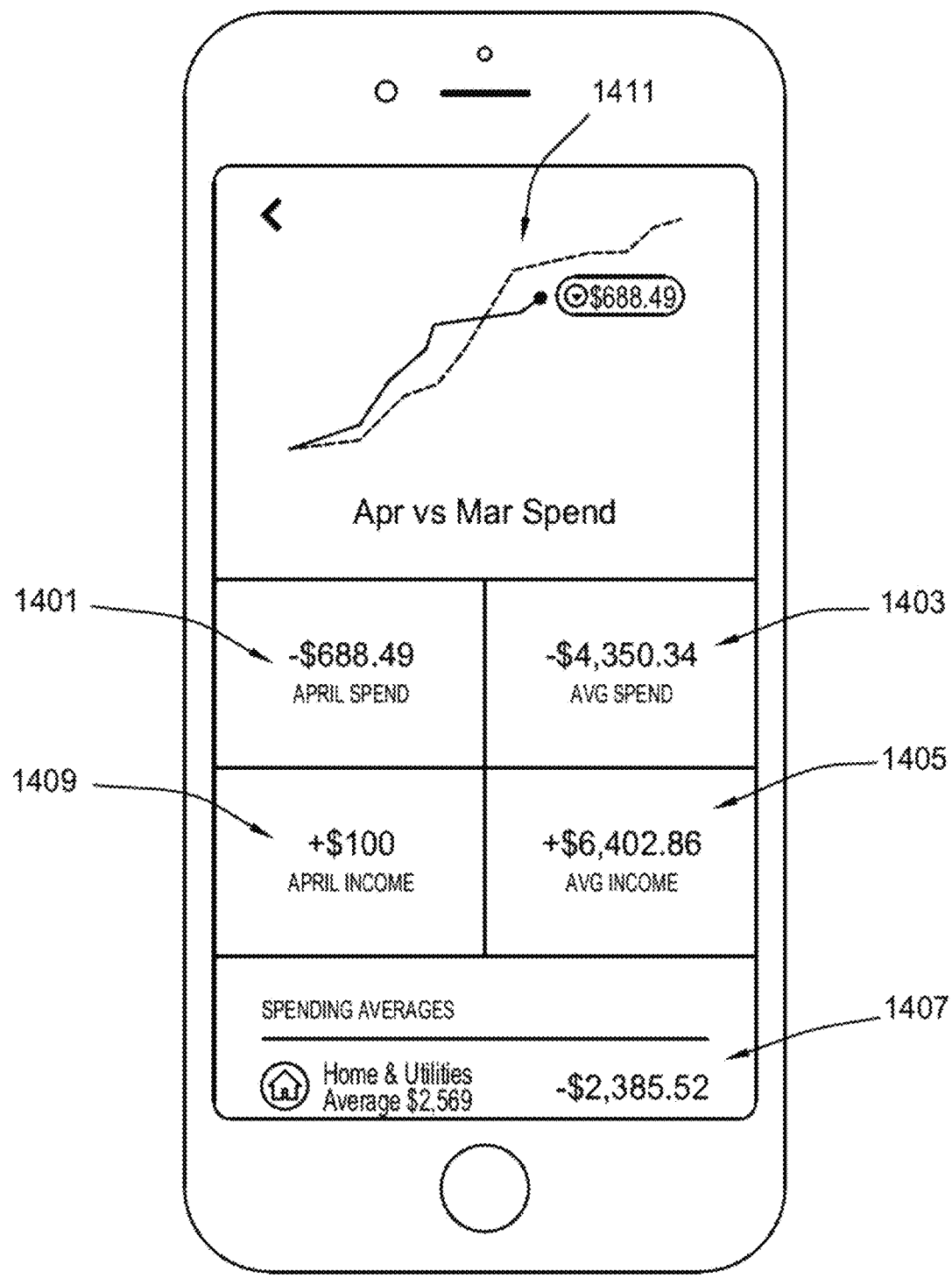
FIG. 14 illustrates an example embodiment of analytics related to an account.

FIG. 14 illustrates an exemplary embodiment of analytics related to an account. Field 1401 can present the amount of funds the user spent in the month of April, i.e., −$688.49. Field 1403 can present the average amount the user spends in a month, i.e., −$4,350.34. Field 1405 can present the user's average income for a period of time, e.g., a month, and in this case presents +$6,402.86. Field 1407 can present the amount the user spends on certain categories or budget items; this example includes "Home & Utilities." Field 1407 further includes the amount spent on "Home & Utilities" in April, i.e., −$2385.52. Field 1409 can present the user's income in a month, i.e., +$100. Field 1411 can present a comparison spending between April and March in the form of a line graph. In this example, April is not over, so the graph of spending in April is incomplete. Field 1411 can also include the total amount of spending ($688.49).

Although certain illustrative, non-limiting exemplary embodiments have been presented, various changes, substitutions, permutations, and alterations can be made without departing from the scope of the appended claims. Further, the steps of the methods described herein may be carried out in any suitable order, or simultaneously where appropriate. Thus, the scope of the invention should not necessarily be limited by this description.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes, or it may comprise a special purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions for operations on a processor, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

The exemplary embodiments can relate to an apparatus for performing one or more of the functions described herein. This apparatus may be specially constructed for the required purposes or be selectively activated or reconfigured by computer executable instructions stored in non-transitory computer memory medium or non-transitory computer-readable storage medium.

It is to be appreciated that the various components of the technology can be located at distant portions of a distributed network or the Internet, or within a dedicated secured, unsecured, addressed/encoded or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying or communicating data to and from the connected elements. The term "module" as used herein can refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Presently preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

I claim:

1. A computer-implemented method comprising:
    upon receiving a plurality of transactions comprising transaction data from a merchant acquirer server or a system of record server, generating, by a consumer computing system (CCS) server, in a transaction database a transaction record of each transaction, wherein the transaction record of each transaction comprises a credit or a debit to a copy of an account balance, wherein the account balance is maintained by the system of record server, and wherein the account balance is associated with a main account that has been integrated with one or more sub-accounts;
    automatically identifying, by the CCS server, a first transaction record and a second transaction record in the transaction database having sufficiently similar transaction data to qualify as a recurring transaction, based on one or more comparison algorithms, wherein the one or more comparison algorithms compare the first transaction record with the second transaction record based on one or more parameters, wherein the one or more parameters comprise one or more of time of transaction, number of recurrences, amount, merchant category code, account number, address, or payment type;
    determining, by the CCS server, if the first transaction and the second transaction qualify as a recurring transaction;
    generating, by the CCS server, using one or more prediction algorithms and based on the determination, a potential transaction record comprising potential transaction data associated with the first transaction record and the second transaction record;
    storing, by the CCS server, in the transaction database, the potential transaction record, wherein the potential transaction record comprises an indication that the potential transaction data represents a potential transaction that has not yet occurred;
    receiving, by the CCS server, a payment request from a user computing device or a merchant-acquirer computing device; and
    upon determining by the CCS server that the payment request is associated with the potential transaction record based upon identification information of the user computing device or the merchant-acquirer computing device:
        identifying, by the CCS server, a sub-account of the one or more sub-accounts that have been integrated with the main account, wherein the sub-account is associated with the payment request based upon the identification information of the user computing device or the merchant-acquirer computing device;
        upon approving the payment request, immediately updating, by the CCS server, a sub-account balance of the identified sub-account and the copy of the account balance;
        simultaneously transmitting, by the CCS server to the system of record server, a message to reflect the approval of the payment request and update the balance stored in the system of record server;
        synchronizing, by the CCS server, the copy of the account balance with the account balance maintained in the record in the system of record server; and
        transmitting, by the CCS server to the user computing device, a confirmation message configured to be rendered at the user computing device to indicate that a recurring transaction has been completed.

2. The method according to claim 1 further comprising, in response to receiving the payment request:
    retrieving, by the CCS server, one or more transaction records comprising potential transaction data from the transaction database;

applying, by the CCS server, the retrieved one or more transaction records comprising potential transaction data to a current balance of the account to determine a predicted balance; and transmitting, from the CCS server, to the user computing device, a second message for display on a graphical user interface of the user computing device upon determining that the payment request would cause the predicted balance to cross a threshold value.

3. The method according to claim 2 further comprising: polling, by the server, the system of record server to determine whether the account received one or more credits; and if the account received one or more credits, applying the one or more credits to one or more sub-accounts established by the server.

4. The method according to claim 3 further comprising: receiving a command to transfer at least a portion of the one or more credits to a different sub-account.

5. The method according to claim 3 further comprising: displaying, on the user computing device, at least a portion of the transaction data in a conversational view of the graphical user interface on the user computing device.

6. The method according to claim 2 further comprising: crediting or debiting, by the server, two or more sub-accounts on a percentage basis upon receiving a transaction.

7. The method according to claim 2 further comprising:
receiving, at the CCS server, an additional credit to the account, wherein an amount of the additional credit is sufficient to pay for the potential transaction and raise the account balance to greater than the threshold value; and
transmitting, from the CCS server in response to receiving the additional credit, to the user computing device, a message for display on a graphical user interface of the user computing device, upon determining that the account balance is sufficient to satisfy the potential transaction.

8. A system comprising:
one or more processors; and
one or more computer-readable non-transitory storage media coupled to one or more of the processors and comprising instructions operable when executed by one or more of the processors to cause the system to:
upon receiving a plurality of transactions comprising transaction data from a merchant acquirer server or a system of record server, generate, by a consumer computing system (CCS) server, in a transaction database a transaction record of each transaction, wherein the transaction record of each transaction comprises a credit or a debit to a copy of an account balance, wherein the account balance is maintained by the system of record server, and wherein the account balance is associated with a main account that has been integrated with one or more sub-accounts;
automatically identify, by the CCS server, a first transaction record and a second transaction record in the transaction database having sufficiently similar transaction data to qualify as a recurring transaction, based on one or more comparison algorithms, wherein the one or more comparison algorithms compare the first transaction record with the second transaction record based on one or more parameters, wherein the one or more parameters comprise one or more of time of transaction, number of recurrences, amount, merchant category code, account number, address, or payment type;

determine, by the CCS server, if the first transaction and the second transaction qualify as a recurring transaction;
generate, by the CCS server, using one or more prediction algorithms and based on the determination, a potential transaction record comprising potential transaction data associated with the first transaction record and the second transaction record;
store, by the CCS server, in the transaction database, the potential transaction record, wherein the potential transaction record comprises an indication that the potential transaction data represents a potential transaction that has not yet occurred;
receive, by the CCS server, a payment request from a user computing device or a merchant-acquirer computing device; and
upon determining by the CCS server that the payment request is associated with the potential transaction record based upon identification information of the user computing device or the merchant-acquirer computing device:
identify, by the CCS server, a sub-account of the one or more sub-accounts that have been integrated with the main account, wherein the sub-account is associated with the payment request based upon the identification information of the user computing device or the merchant-acquirer computing device;
upon approving the payment request, immediately update, by the CCS server, a sub-account balance of the identified sub-account and the copy of the account balance;
simultaneously transmit, by the CCS server to the system of record server, a message to reflect the approval of the payment request and update the balance stored in the system of record server;
synchronize, by the CCS server, the copy of the account balance with the account balance maintained in the record in the system of record server; and
transmit, by the CCS server to the user computing device, a confirmation message configured to be rendered at the user computing device to indicate that a recurring transaction has been completed.

9. The system according to claim 8 wherein the processors are further operable when executing the instructions to, in response to receiving the payment request:
retrieve, by the CCS server, one or more transaction records comprising potential transaction data from the transaction database;
apply, by the CCS server, the retrieved one or more transaction records comprising potential transaction data to a current balance of the account to determine a predicted balance; and
transmit, from the CCS server, to the user computing device, a second message for display on a graphical user interface of the user computing device upon determining that the payment request would cause the predicted balance to cross a threshold value.

10. The system according to claim 9 wherein the processors are further operable when executing the instructions to:
poll the system of record server to determine whether the account received one or more credits; and
if the account received one or more credits, apply the one or more credits to one or more sub-accounts established by the server.

11. The system according to claim 10 wherein the processors are further operable when executing the instructions to:

receive a command to transfer at least a portion of the one or more credits to a different sub-account.

12. The system according to claim 10 wherein the processors are further operable when executing the instructions to:
provide for display on the user computing device, at least a portion of the transaction data in a conversational view of the graphical user interface on the user computing device.

13. The system according to claim 9 wherein the processors are further operable when executing the instructions to:
credit or debit two or more sub-accounts on a percentage basis upon receiving a transaction.

14. The system according to claim 9 wherein the processors are further operable when executing the instructions to:
receive, at the CCS server, an additional credit to the account, wherein an amount of the additional credit is sufficient to pay for the potential transaction and raise the account balance to greater than the threshold value; and
transmit, from the CCS server in response to receiving the additional credit, to the user computing device, a message for display on a graphical user interface of the user computing device, upon determining that the account balance is sufficient to satisfy the potential transaction.

15. One or more computer-readable non-transitory storage media embodying software that is operable when executed to:
upon receiving a plurality of transactions comprising transaction data from a merchant acquirer server or a system of record server, generate, by a consumer computing system (CCS) server, in a transaction database a transaction record of each transaction, wherein the transaction record of each transaction comprises a credit or a debit to a copy of an account balance, wherein the account balance is maintained by the system of record server, and wherein the account balance is associated with a main account that has been integrated with one or more sub-accounts;
automatically identify, by the CCS server, a first transaction record and a second transaction record in the transaction database having sufficiently similar transaction data to qualify as a recurring transaction, based on one or more comparison algorithms, wherein the one or more comparison algorithms compare the first transaction record with the second transaction record based on one or more parameters, wherein the one or more parameters comprise one or more of time of transaction, number of recurrences, amount, merchant category code, account number, address, or payment type;
determine, by the CCS server, if the first transaction and the second transaction qualify as a recurring transaction;
generate, by the CCS server, using one or more prediction algorithms and based on the determination, a potential transaction record comprising potential transaction data associated with the first transaction record and the second transaction record;
store, by the CCS server, in the transaction database, the potential transaction record, wherein the potential transaction record comprises an indication that the potential transaction data represents a potential transaction that has not yet occurred;
receive, by the CCS server, a payment request from a user computing device or a merchant-acquirer computing device; and
upon determining by the CCS server that the payment request is associated with the potential transaction record based upon identification information of the user computing device or the merchant-acquirer computing device:
identify, by the CCS server, a sub-account of the one or more sub-accounts that have been integrated with the main account, wherein the sub-account is associated with the payment request based upon the identification information of the user computing device or the merchant-acquirer computing device;
upon approving the payment request, immediately update, by the CCS server, a sub-account balance of the identified sub-account and the copy of the account balance;
simultaneously transmit, by the CCS server to the system of record server, a message to reflect the approval of the payment request and update the balance stored in the system of record server;
synchronize, by the CCS server, the copy of the account balance with the account balance maintained in the record in the system of record server; and
transmit, by the CCS server to the user computing device, a confirmation message configured to be rendered at the user computing device to indicate that a recurring transaction has been completed.

16. The media according to claim 15 wherein the software is further operable when executed to, in response to receiving the payment request:
retrieve, by the CCS server, one or more transaction records comprising potential transaction data from the transaction database;
apply, by the CCS server, the retrieved one or more transaction records comprising potential transaction data to a current balance of the account to determine a predicted balance; and
transmit, from the CCS server, to the user computing device, a second message for display on a graphical user interface of the user computing device upon determining that the payment request would cause the predicted balance to cross a threshold value.

17. The media according to claim 16 wherein the software is further operable when executed to:
poll, by the server, the system of record server to determine whether the account received one or more credits; and
if the account received one or more credits, apply the one or more credits to one or more sub-accounts established by the server.

18. The media according to claim 17 wherein the software is further operable when executed to:
receive a command to transfer at least a portion of the one or more credits to a different sub-account.

19. The media according to claim 17 wherein the software is further operable when executed to:
provide for display, on the user computing device, at least a portion of the transaction data in a conversational view of the graphical user interface on the user computing device.

20. The media according to claim 16 wherein the software is further operable when executed to:
credit or debit, by the server, two or more sub-accounts on a percentage basis upon receiving a transaction.

21. The media according to claim 16 wherein the software is further operable when executed to:
receive, at the CCS server, an additional credit to the account, wherein an amount of the additional credit is sufficient to pay for the potential transaction and raise the account balance to greater than the threshold value; and transmit, from the CCS server in response to receiving the additional credit, to the user computing device, a message for display on a graphical user interface of the user computing device, upon determining that the account balance is sufficient to satisfy the potential transaction.

* * * * *